United States Patent [19]

Helbig, Sr.

[11] Patent Number: 4,962,381
[45] Date of Patent: Oct. 9, 1990

[54] SYSTOLIC ARRAY PROCESSING APPARATUS

[75] Inventor: Walter A. Helbig, Sr., Medford Lakes, N.J.

[73] Assignee: General Electric Company, Moorestown, N.J.

[21] Appl. No.: 336,997

[22] Filed: Apr. 11, 1989

[51] Int. Cl.$^5$ .............................................. G01S 7/03
[52] U.S. Cl. ................................... 342/372; 342/374; 367/103
[58] Field of Search ............................ 342/371–375, 342/377, 195; 367/103, 119, 123; 364/754, 841, 724.01; 371/8.1, 11.3; 73/626; 128/660.01, 661.01

[56] References Cited

U.S. PATENT DOCUMENTS

| | | |
|---|---|---|
| 3,680,109 | 7/1972 | Steudel . |
| 3,803,625 | 4/1974 | Nemit . |
| 4,143,379 | 3/1979 | Wheeler . |
| 4,191,960 | 3/1980 | Lopez . |
| 4,493,048 | 1/1985 | Kung et al. ............... 364/724.01 X |
| 4,616,230 | 10/1986 | Antonucci et al. . |
| 4,633,256 | 12/1986 | Chadwick . |
| 4,686,532 | 8/1987 | McAulay ..................... 342/195 |
| 4,692,768 | 9/1987 | Becavin . |
| 4,698,751 | 10/1987 | Parvin ........................ 364/754 X |
| 4,698,807 | 10/1987 | Marwood et al. ............ 371/11.3 |
| 4,727,503 | 2/1988 | McWhirter .................. 364/754 X |
| 4,758,999 | 7/1988 | Marwood et al. ........... 367/119 X |

Primary Examiner—Thomas H. Tarcza
Assistant Examiner—Tod Swann
Attorney, Agent, or Firm—William H. Meise

[57] ABSTRACT

A rectangular antenna array includes a plurality of systolic vertical line arrays. Each vertical line array includes a plurality of signal processors. Within each line array, the signals received at any one moment are held or delayed as required, and the processors progressively form partial sums in an upward direction during first clock intervals and in a downward direction during alternate clock intervals. During each clock intervals, complete sums for one sample interval appear at an end of the vertical line array. The sums appear alternately at the top and the bottom of the line arrays. Beamforming in the horizontal direction is accomplished with systolic horizontal adders coupled to the tops and bottoms of the vertical line arrays. The horizontal adders transfer information and add in one direction during first clock intervals, and then in the other direction during third clock intervals of a four-interval cycle. In a particular embodiment of the invention, multiple inputs and outputs associated with each processor allows continued operation in the event of partial or complete failure of one or more processors.

9 Claims, 17 Drawing Sheets

| PROCESSOR SUBMODULE ELEMENT NO. | TIME INTERVAL | | | | | |
|---|---|---|---|---|---|---|
| | T0 | T1 | T2 | T3 | T4 | T5 |
| 301 | SAMPLE $d_{10}$ | TRANSFER $d_{10}$ TO 302 | | | | |
| 302 | SAMPLE $d_{20}$ | ADD $d_{10} + d_{20}$ $= S_{20}$ | *TRANSFER $S_{20}$ TO 303* | | | |
| 303 | SAMPLE $d_{30}$ | HOLD $d_{30}$ | ADD $d_{30} + S_{20} = S_{30}$ | TRANSFER $S_{30}$ TO 304 | | |
| 304 | SAMPLE $d_{40}$ | HOLD $d_{40}$ | HOLD $d_{40}$ | ADD $d_{40} + S_{30} = S_{40}$ | TRANSFER $S_{40}$ TO 305 | |
| 305 | SAMPLE $d_{50}$ | HOLD $d_{50}$ | HOLD $d_{50}$ | HOLD $d_{50}$ | ADD $d_{50} + S_{40} = S_{50}$ | TRANSFER $S_{50}$ TO OUTPUT |

*FIG. 3b*

| PROCESSOR SUBMODULE ELEMENT NO. | TIME INTERVAL | | | | | | | |
|---|---|---|---|---|---|---|---|---|
| | T0 | T1 | T2 | T3 | T4 | T5 | T6 | T7 |
| 301 | SAMPLE $d_{10}$ | TRANSFER $d_{10}$ TO 302 | SAMPLE $d_{12}$ | TRANSFER $d_{12}$ TO 302 | | | | |
| 302 | SAMPLE $d_{20}$ | ADD $d_{10}+d_{20}$ $=S_{20}$ | SAMPLE $d_{22}$ TR $S_{20}$ TO 303 | ADD $d_{12}+d_{22}$ $=S_{22}$ | TR $S_{22}$ TO 303 | | | |
| 303 | SAMPLE $d_{30}$ | HOLD $d_{30}$ | SAMPLE $d_{32}$ ADD $S_{20}+d_{30}$ $=S_{30}$ | TRANSFER $S_{30}$ TO 304; HOLD $d_{32}$ | ADD $S_{22}+d_{32}$ $=S_{32}$ | TRANSFER $S_{32}$ TO 304 | | |
| 304 | SAMPLE $d_{40}$ | HOLD $d_{40}$ | SAMPLE $d_{42}$ HOLD $d_{40}$ | ADD $S_{30}+d_{40}$ $=S_{40}$; HOLD $d_{42}$ | TRANSFER $S_{40}$ TO 305; HOLD $d_{42}$ | ADD $S_{32}+d_{42}$ $=S_{42}$ | TRANSFER $S_{42}$ TO 305 | |
| 305 | SAMPLE $d_{50}$ | HOLD $d_{50}$ | SAMPLE $d_{52}$ HOLD $d_{50}$ | HOLD $d_{50}$ AND $d_{52}$ | ADD $S_{40}+d_{50}$ $=S_{50}$ HOLD $d_{52}$ | TRANSFER $S_{50}$ TO OUTPUT HOLD $d_{52}$ | ADD $S_{42}+d_{52}$ $=S_{52}$ | TRANSFER $S_{52}$ TO OUTPUT |

*FIG. 4*

| PROCESSOR SUBMODULE ELEMENT NO. | TIME INTERVAL | | | | | | |
|---|---|---|---|---|---|---|---|
| | T0 | T1 | T2 | T3 | T4 | T5 | T6 |
| 301 | — | SAMPLE $d_{11}$ | HOLD $d_{11}$ | HOLD $d_{11}$ | HOLD $d_{11}$ | ADD $S_{21}+d_{11}$ $=S_{11}$ | TRANSFER $S_{11}$ TO OUTPUT |
| 302 | — | SAMPLE $d_{21}$ | HOLD $d_{21}$ | HOLD $d_{21}$ | ADD $S_{31}+d_{21}$ $=S_{21}$ | TRANSFER $S_{21}$ TO 301 | |
| 303 | — | SAMPLE $d_{31}$ | HOLD $d_{31}$ | ADD $S_{41}+d_{31}$ $=S_{31}$ | TRANSFER $S_{31}$ TO 302 | | |
| 304 | — | SAMPLE $d_{41}$ | ADD $d_{51}+d_{41}$ $=S_{41}$ | TRANSFER $S_{41}$ TO 303 | | | |
| 305 | — | SAMPLE $d_{51}$ | TR $d_{51}$ TO 304 | | | | |

| | T0 | T1 | T2 | T3 | T4 | T5 | T6 | T7 | T8 |
|---|---|---|---|---|---|---|---|---|---|
| 301 | — | SAMPLE $d_{11}$ | HOLD $d_{11}$ | HOLD $d_{11}$ SAMPLE $d_{13}$ | HOLD $d_{11}$ AND $d_{13}$ | HOLD $d_{13}$ ADD $S_{21}+d_{11}=S_{11}$ | HOLD $d_{13}$ TRANSFER $S_{11}$ TO OUTPUT | ADD $S_{23}+d_{13}=S_{13}$ | TRANSFER $S_{13}$ TO OUTPUT |
| 302 | — | SAMPLE $d_{21}$ | HOLD $d_{21}$ | HOLD $d_{21}$ SAMPLE $d_{23}$ | HOLD $d_{23}$ ADD $S_{31}+d_{21}=S_{21}$ | HOLD $d_{23}$ TRANSFER $S_{21}$ TO 301 | ADD $S_{33}+d_{23}=S_{23}$ | TRANSFER $S_{23}$ TO 301 | |
| 303 | — | SAMPLE $d_{31}$ | HOLD $d_{31}$ | ADD $S_{41}+d_{31}=S_{31}$ SAMPLE $d_{33}$ | HOLD $d_{33}$ TRANSFER $S_{31}$ TO 302 | ADD $S_{43}+d_{33}=S_{33}$ | TRANSFER $S_{33}$ TO 302 | | |
| 304 | — | SAMPLE $d_{41}$ | ADD $S_{51}+d_{41}=S_{41}$ | TRANSFER $S_{41}$ TO 303 SAMPLE $d_{43}$ | ADD $d_{53}=S_{43}$ | TRANSFER $S_{43}$ TO 303 | | | |
| 305 | — | SAMPLE $d_{51}$ | TRANSFER $d_{51}$ TO 304 | SAMPLE $d_{53}$ | TRANSFER $d_{53}$ TO 304 | | | | |

TIME INTERVAL

FIG. 7a

| | | | TIME INTERVAL | | |
|---|---|---|---|---|---|
| | | T0 | T1 | T2 | T3 |
| SAMPLE/TRANSFER | 301 | SAMPLE $d_{10}$ | TRANSFER $d_{10}$ TO 302 | SAMPLE $d_{12}$ | TRANSFER $d_{12}$ TO 302 |
| S/H/H/H/A/T | | | SAMPLE $d_{11}$ | HOLD $d_{11}$ | HOLD $d_{11}$ SAMPLE $d_{13}$ |
| SAMPLE/ADD/TRANSFER | 302 | SAMPLE $d_{20}$ | ADD $d_{10}+d_{20}=S_{20}$ | SAMPLE $d_{22}$ TRANSFER $S_{20}$ TO 303 | ADD $d_{12}+d_{22}=S_{22}$ |
| S/H/H/H/A/T/S/H | | | SAMPLE $d_{21}$ | HOLD $d_{21}$ | HOLD $d_{21}$ SAMPLE $d_{23}$ |
| S/H/A/T | 303 | SAMPLE $d_{30}$ | HOLD $d_{30}$ | SAMPLE $d_{32}$ ADD $S_{20}+d_{30}=S_{30}$ | TRANSFER $S_{30}$ TO 304 HOLD $d_{32}$ ADD $S_{41}+d_{31}=S_{31}$ |
| S/H/H/A/T/S/H | | | SAMPLE $d_{31}$ | HOLD $d_{31}$ | SAMPLE $d_{33}$ |
| S/H/A/T/S/H | 304 | SAMPLE $d_{40}$ | HOLD $d_{40}$ | SAMPLE $d_{42}$ HOLD $d_{40}$ | ADD $S_{30}+d_{40}=S_{40}$ HOLD $d_{42}$ TRANSFER $S_{41}$ TO 303 |
| S/A/T/S/A/T | | | SAMPLE $d_{41}$ | ADD $d_{51}+d_{41}=S_{41}$ | SAMPLE $d_{43}$ |
| S/H/H/H/A/T | 305 | SAMPLE $d_{50}$ | HOLD $d_{50}$ | SAMPLE $d_{52}$ HOLD $d_{50}$ | HOLD $d_{50}$, $d_{52}$ |
| S/T/S/T | | | SAMPLE $d_{51}$ | TRANSFER $d_{51}$ TO 304 | SAMPLE $d_{53}$ |

FIG. 7b

| TIME INTERVAL | | | |
|---|---|---|---|
| T4 | T5 | T6 | T7 |
| SAMPLE $d_{14}$ | TRANSFER $d_{14}$ TO 302<br>HOLD $d_{13}$<br>ADD $S_{21}+d_{11}=S_{11}$<br>SAMPLE $d_{15}$ | SAMPLE $d_{16}$<br>TRANSFER $S_{11}$ TO OUTPUT<br>HOLD $d_{13}, d_{15}$ | TRANSFER $d_{16}$ TO 302<br>HOLD $d_{13}, d_{15}$<br>ADD $S_{23}+d_{13}=S_{13}$<br>SAMPLE $d_{17}$ |
| HOLD $d_{11}, d_{13}$ | ADD $d_{14}+d_{24}=S_{24}$<br>TRANSFER $S_{21}$ TO 301<br>HOLD $d_{23}$<br>SAMPLE $d_{25}$ | SAMPLE $d_{26}$<br>TRANSFER $S_{24}$ TO 303<br>HOLD $d_{25}$<br>ADD $S_{33}+d_{23}=S_{23}$ | ADD $d_{16}+d_{26}=S_{26}$<br>HOLD $d_{25}$<br>TRANSFER $S_{23}$ TO 301<br>SAMPLE $d_{27}$ |
| SAMPLE $d_{24}$<br>TRANSFER $S_{22}$ TO 303<br>ADD $S_{31}+d_{21}=S_{21}$<br>HOLD $d_{23}$ | TRANSFER $S_{32}$ TO 304<br>HOLD $d_{34}$<br>ADD $S_{43}+d_{33}=S_{33}$<br>SAMPLE $d_{35}$ | SAMPLE $d_{36}$<br>ADD $S_{24}+d_{34}=S_{34}$<br>TRANSFER $S_{33}$ TO 302<br>HOLD $d_{35}$ | TRANSFER $S_{34}$ TO 304<br>HOLD $d_{36}$<br>ADD $S_{45}+d_{35}=S_{35}$<br>SAMPLE $d_{37}$ |
| SAMPLE $d_{34}$<br>ADD $S_{22}+d_{32}=S_{32}$<br>TRANSFER $S_{31}$ TO 302<br>HOLD $d_{33}$ | ADD $S_{32}+d_{42}=S_{42}$<br>HOLD $d_{44}$<br>TRANSFER $S_{33}$ TO 303<br>SAMPLE $d_{45}$ | SAMPLE $d_{46}$<br>TRANSFER $S_{42}$ TO 305<br>HOLD $d_{44}$<br>ADD $S_{55}+d_{45}=S_{45}$ | ADD $S_{34}+d_{44}=S_{44}$<br>HOLD $d_{46}$<br>TRANSFER $S_{45}$ TO 303<br>SAMPLE $d_{47}$ |
| SAMPLE $d_{44}$<br>TRANSFER $S_{40}$ TO 305<br>HOLD $d_{42}$<br>ADD $d_{43}+d_{43}=S_{33}$ | TRANSFER<br>$S_{50}$ TO OUTPUT<br>HOLD $d_{52}, d_{54}$<br>SAMPLE $d_{55}$ | SAMPLE $d_{56}$<br>ADD $S_{42}+d_{52}=S_{52}$<br>HOLD $d_{54}$ | TRANSFER<br>$S_{52}$ TO OUTPUT<br>HOLD $d_{54}, d_{56}$<br>SAMPLE $d_{57}$ |
| SAMPLE $d_{54}$<br>ADD $S_{50}+d_{50}=S_{50}$<br>HOLD $d_{52}$<br>TRANSFER $d_{53}$ TO 304 | TRANSFER $d_{55}$ TO 304 | TRANSFER $d_{55}$ TO 304 | |

SYSTOLIC ARRAY PROCESSING APPARATUS

This invention relates to systolic array processors having utility for digital antenna beam forming, as for radar, and for other purposes such as sonar array beam forming, and medical ultrasound and other imaging.

For many purposes it is desirable to process signals received simultaneously. Simultaneous reception of signals occurs, for example, when the returns from a radar target impinge upon a rectangular array antenna. In the case of large antenna arrays, the dimensions of the antenna may extend over many wavelengths, such as array antennas having a diameter of 20 feet or more operating at one GHz or above. Also, the information retrieval rate may be high, as for example an air defense radar having an instantaneous bandwidth of many tens or even hundreds of megahertz. A problem which may arise in such multi-wavelength, high bandwidth antennas is illustrated in FIG. 1. FIG. 1a illustrates a line array 8 of antennas 10. In FIG. 1a, array 8 includes antennas 10a, 10b, 10c and central antenna 10d, and further symmetrically disposed antennas 10c', 10b', and 10a'. In order to perform antenna beamforming, a signal combiner illustrated as 12 is located somewhere behind the plane of the antenna array. Combiner 12 is connected to each antenna by a transmission line. For example, antenna 10a is connected to combiner 12 by a transmission line illustrated as 14a. Similarly, antenna 10b is connected to combiner 12 by a transmission line 14b, and antenna 10d is connected to combiner 12 by a transmission line 14d.

When the information rate being carried is high, a particular increment of information representing, for example, the incremental relative amplitude and phase of a returned signal, may occupy only a small portion of a transmission line. In FIG. 1a, such a small portion might be represented by section 16 of transmission line 14a. No matter where combiner 12 is located, the physical distance between the combiner and the various antenna elements 10 differs. If each transmission line 14 of FIG. 1a extends in a relatively direct manner between combiner 12 and each antenna, the electrical path lengths between each antenna and combiner 12 will differ as between mutually adjacent antennas. Consequently, signals arriving at antenna 10d which may be associated with a bit of information arriving simultaneously at antenna 10a may not arrive at combiner 12 at the same time. However, most types of signal processing require that associated signals arrive at the same time.

It is known to correct the problem illustrated in FIG. 1a by providing equal transmission line lengths between combiner 12 and each antenna element 10. This, however, requires that at least some of the transmission lines extending between combiner 12 and the antennas be folded, especially for the shorter path lengths. This may be difficult even if the transmission lines are in the form of flexible coaxial cables, because for a large array there may be large bundles of cable located behind the aperture of the antenna array behind those antennas for which the physical path lengths to the combiner are shortest. Where the radar operating frequencies are high enough so that it is desirable to use waveguide to minimize losses, the problem of equalizing path lengths by equalizing the lengths of the transmission lines becomes virtually impossible to solve.

As a result of the difficulty of equalizing the transmission path length, a scheme might be used which is represented in FIG. 1b. In FIG. 1b, elements corresponding to those of FIG. 1a are designated by the same reference numerals. In FIG. 1b, antennas 10a and 10a' are connected to combiner 12 by transmission lines 14a and 14a' identical to those of FIG. 1a. However, the transmission lines connecting antennas 10b, 10c, 10d, 10c' and 10d'' to combiner 12 are designated 16b, 16c, ... 16b', 16c' to indicate that their lengths are selected merely to extend between the combiner and the antenna, rather than being selected to a longer length to equalize time delay. The difference in time delay is made up by associating with each of antennas 10b, 10c, 10d, 10c' and 10d' a delay circuit 18b, 18c, 18d, 18c' and 18d', respectively. Delay circuits 18 provide a delay which is selected to make up the difference between the delay provided by transmission lines 14a and 14a' and that provided by the transmission line 16.

The arrangement described in conjunction with FIG. 1b has a further disadvantage, however. In general, each of antenna elements 10 is associated with a delay 18 which differs from one location in the array to the next. It would be prohibitively expensive to manufacture myriad delay units with a total number almost equal to the number of antennas in the array, each tailored to suit the delay of one or a few antenna elements having identical delays, and with each different version having a production run of only one or a few units. For example, in FIG. 1b, three separate designs of delay units would be required, namely a first design having a relatively large delay D1 for delay element 18d, a second design having a delay D2 suitable for use as the delay elements 18c and 18c', and a third design having delay D3 suitable for use only in locations 18b and 18b'. It can be readily understood, for an array including hundreds or even thousands of antenna elements, that enormous effort would be required to design and produce the necessary delay elements. Further effort would be required to make sure that they were installed in the correct locations. Finally, the stocking of replacement delay units for repair purposes would be an expensive and formidable task.

Another way to handle the problem might be to provide all delay units 18 with the same magnitude of delay, namely a delay equal to the maximum that might be required, such as delay D1 which would be required by delay element 18d. If the delay elements were designed so as to be adjustable, a single design could be produced in large quantities. Upon installation, each delay unit could then simply be adjusted to the correct delay value, depending upon the installed location. Such a solution, however, has the disadvantage that all of the elements must have the maximum possible delay, which tends to make each element very expensive. Furthermore, the requirement for adjustment increases the cost of the design, rendering it more complex and therefore less reliable, and further such a solution requires the use of skilled personnel, and gives rise to the possibility of misadjustment.

Another possible solution is to use adder or combiner trees for summing the data or information. Thus, from an array of N antennas, pairs of adjacent antennas of the array are coupled to an adder, so there are N/2 first-level adders. The first-level adders are coupled in pairs to second-level adders, etc., to as many levels as may be required. When the array is large, each successive level adder combines data originating from twice the spacing as the previous level. For example, each adder of the first level combines data from antenna elements which may be just two inches apart, the second level combines data originating from points that would be four inches apart, and so forth. The last few adders combine data from half-way across the array. For a large array and high data rates, the tolerances which must be maintained would be excessive for a production environment.

An improved array processing technique is desired.

SUMMARY OF THE INVENTION

A systolic line-array apparatus for combining information received substantially simultaneous at a plurality of input terminals spread over a significant reception area includes a processor at each of the reception locations. Each processor includes an input port adapted to be coupled to the input terminal at the location. Each processor includes a store for storing received data and also includes at least two input/output terminals which can be configured either singularly or alternately as inputs or outputs. Each processor operates in at least first and second conditions. In the first condition, each processor accepts data associated with a particular interval from an adjoining processor at a first one of the input/output terminals for combining the data so received from the adjoining processor with that portion of the stored data received at the input port which is associated with that particular interval, and produces a combined signal at the second input/output terminal. In a second operating condition, the processor accepts data associated with another one of the intervals from another adjoining processor at the second of the input/output terminals, and combines the data so received with that portion of the stored data received at its input port during that other interval to produce a combined signal at the first input/output port. In one embodiment of the invention, the first and second conditions alternate at a clock rate, and combined data flows alternately from the first and second input/output terminals. An aspect of the invention lies in configuring each processor within the array so that, in general, each processor alternately accepts data from the processors above and below. According to a particularly advantageous aspect of the invention, the number of processors in a one-dimensional portion of the array is an odd number.

DESCRIPTION OF THE DRAWING

FIG. 3b is a timing chart describing the operation of the receive processors thereof for processing a single signal sample received at time T0 in a downward direction along the column array;

FIG. 4 is a timing chart similar to FIG. 3b including further information relating to the reception and processing of a second signal sample received at time T2;

FIG. 5 is a timing chart describing the operation of the receive processors of FIG. 3a for processing a single signal sample received at time T1 in an upward direction along the column array;

FIG. 6 is a timing chart similar to FIG. 5 including further information relating to the processing of a second signal sample received at a time T3 in an upward direction;

FIG. 7 comprising FIGS. 7a and 7b which may be juxtaposed to form a complete figure, is a timing chart describing the operation of the receive signal processors of FIG. 3a for operation in a continuous operating mode with transfer of samples both upward and downward during alternate intervals to produce signals at each of the upper and lower terminals of each column at ½ the basic data rate;

DESCRIPTION OF THE INVENTION

Figure 2:
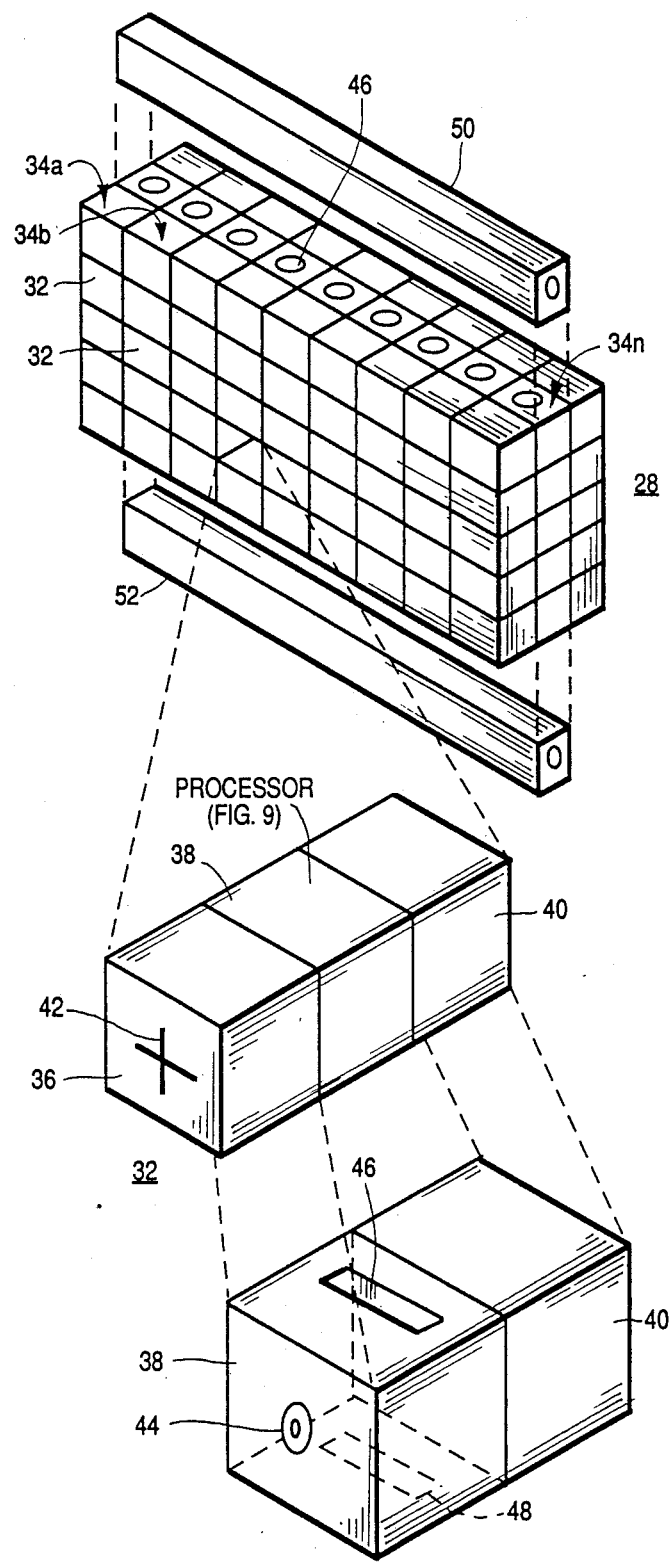
FIG. 2 illustrates in simplified, perspective or isometric view, a rectangular two-dimensional array of module elements, each including an antenna submodule, a signal processor submodule, and a control submodule, with one of the modules illustrated in exploded form.

FIG. 2 illustrates in perspective or isometric view a two-dimensional array designated generally as 28 including vertical columns of module assemblies 32. The general designation 34 is applied to any vertical column of module elements 32. The left-most vertical column 34a includes five modules 32. The next adjacent vertical column is designated 34b, and the right-most column is designated 34n. Each column illustrated in FIG. 2 includes five modules 32.

Each module 32 of array 28 of FIG. 2 includes an antenna submodule 36, a receive signal processing submodule (processor) 38 and a power and control submodule 40. As illustrated in FIG. 2, the surface of submodule 36 facing the viewer includes a crossed-dipole antenna 42 for transducing a selected signal polarization which may be vertical or horizontal linear, or right or left-hand circularly polarized. Such antennas for transducing a single polarization or for transducing any of several polarizations are well known in the art and need no further explanation. Those skilled in the antenna arts know that antennas are reciprocal elements and have the same impedance and gain characteristics whether performing in a transmitting or receiving manner. Receiving terminology is used herein. Antenna submodule 36 may include processing such as downconversion or detection and low-noise amplification for use in a receiving mode, power amplification for use in a transmit mode, and other like functions. It may also include, if desired, an analog-to-digital converter (ADC), not illustrated.

Each antenna submodule 36 of FIG. 2 is coupled to its associated receive signal processor submodule 38 by means of at least one mating radio-frequency (RF) connector set, one portion of which is illustrated as a coaxial connector 44 mounted on a face of processor submodule 38. In a receive mode, signals which are received by antenna 42 are processed in antenna submodule 36 and the signals so processed, which may be in analog form, are coupled by way of connector 44 for further processing in processor module 38.

In FIG. 2, each processor submodule 38, in addition to input port 44 for receiving a portion of the signals applied to the reception surface of array 28, also includes a pair of input/output ports, the upper of which is illustrated as 46 and the lower of which is illustrated by dotted lines as 48. Input/output ports 46 and 48 are each multiple-conductor connectors for carrying parallel digital signals. Those skilled in the art know that binary information may be in the form of plural signals carried simultaneously over a plurality of parallel conductors (parallel data), or by a sequence of signals carried over a single conductor (serial data). Thus, in principle, terminal sets 46 and 48 may have one or many individual contact terminals. For simplicity, each terminal set 46 or 48 is referred to as a "terminal". Each terminal 46 when arrayed makes contact with the corresponding terminal 48 of the next higher module 32 in a column 34. Similarly, each connector 48 mates with and makes electrical connection to the corresponding terminal 46 of the next lower module 32 in a column 34.

At the top of each column 34 of FIG. 2, the uppermost module 32 has its terminal 46 exposed, and similarly the lowermost module 32 of a column has its terminal 48 exposed. As described in more detail below, the terminal 46 of each module 32 which is uppermost in each column 34a, 34b . . . 34n is coupled to a corresponding terminal in an upper combiner illustrated as a horizontally oriented bar 50. Similarly, the exposed terminals 48 of the lowermost modules 32 of each column 34a, 34b, . . . 34n are each coupled to the corresponding terminal of a lower combiner illustrated as a bar 52. The rear face of each power and control submodule 40 (the face facing away and to the right of the viewer in FIG. 2) may be adapted to be coupled to sources of remote antenna beam forming control, clock signals, power sources, coded terminals identifying the particular module location, and like signal sources and sinks (not illustrated).

Figure 3A:
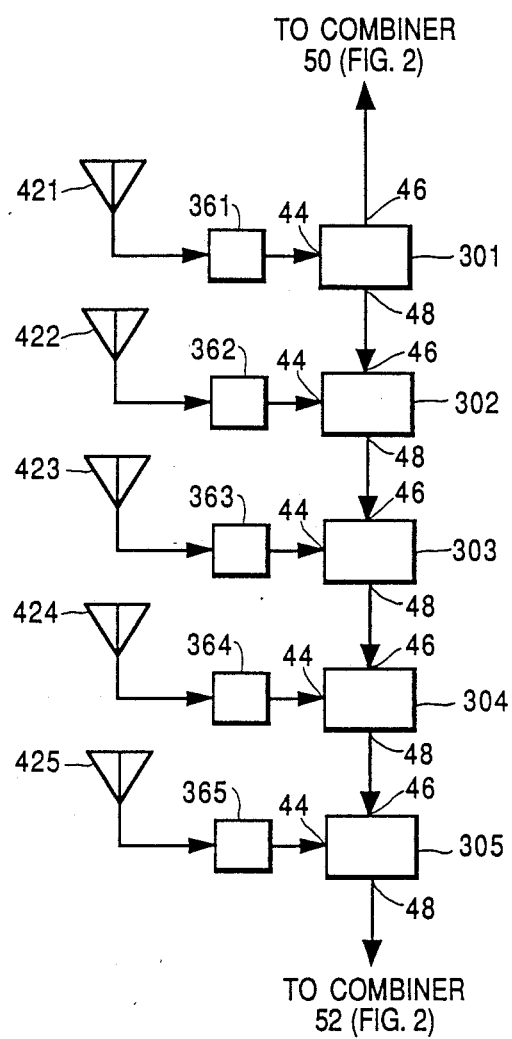
FIG. 3a illustrates in simplified block diagram form a one-dimensional vertical column array which is a portion of the two-dimensional array of FIG. 2.

FIG. 3a illustrates, in simplified block diagram form, portions of one vertical column of modules 32 of FIG. 2. In FIG. 3a, the first or uppermost of antennas 42 of FIG. 2, designated 421, is illustrated as being connected to the first antenna submodule 36 of FIG. 2, designated 361. Submodule 361 is illustrated as being connected to the first signal processing submodule, illustrated as a block designated 301 in FIG. 3a. Similarly, antenna 422 of FIG. 3a is illustrated as being connected to antenna submodule 362, which in turn is connected to signal processing submodule 302, and so forth until penultimate antenna 424 is coupled to antenna submodule block 364, which in turn is coupled to penultimate receive signal processor submodules 304. Lowermost antenna 425 is coupled to antenna submodule 365, which is coupled to receive signal processor submodule 305. The lower terminal 48 of each signal processor submodule (processor) 301–305 (where the hyphen represents the word "through") is coupled to the upper terminal 46 of the next lower processor. As illustrated in FIG. 3a, there are a total of five antennas in the vertical column. Top terminal 46 of processor 301 is connected to combiner 50 of FIG. 2. As also illustrated in FIG. 3a, bottom terminal 48 of processor 301 is connected to upper terminal 46 of processor 302. Similarly, lower terminal 48 of processor 302 is connected to upper terminal 46 of processor 303, and so on. Bottom terminal 48 of bottom processor 305 is connected to combiner 52 of FIG. 2. Although not illustrated in FIG. 3a, processors 301–305 receive clock signals for synchronizing their operations, and other control signals as described hereinafter.

In order to perform antenna beamforming, the signals received must be combined together or summed. The signal samples may be made at a sampling rate high enough so that several samples occur during one cycle of the RF energy impinging upon the antenna array. For a beam directed broadside to the plane of the array, the signals are combined in-phase i.e., without excess delays in the path of any signal. For directing the beam in directions other than broadside, phase shifts or time delays must be introduced into the signal paths. These delays and phase shifts are introduced early in the processing within each processor 301–305 of each column of processors illustrated in FIGS. 2 and 3a, before any signal summing, as described in more detail below. Thus, the summed signal includes phase information which may be used in later Doppler processing and the like. In accordance with an aspect of the invention, the signals are summed by transferring signals from one end of the array toward the other, forming partial sums at each step. Ultimately, the complete sum arrives at the other end of the array. This allows the great convenience of extracting the combined signal from the end of a line array, or from the edge of a two-dimensional array. This in turn eliminates the need for a bulky combining arrangement behind the plane of the array.

In operation of the line array of FIG. 3a, two operating modes occur simultaneously. In order to explain these operating modes, a first operating mode is explained in conjunction with the table of FIG. 3b. The operation of each signal processor submodule during a succession of discrete time intervals T0–T5 is specified in FIG. 3b, assuming that a single signal sample arrives simultaneously at antennas 421–425 at a time T0. At time T0, all the processor submodules (processors or processor elements) 301–305 sample the signal received from their corresponding antennas and antenna submodules. Processor number 301, for example, samples the signal at time T0 to produce a sample designated $d_{10}$, where the first numeral of the subscript represents the processor element (subscript "1" represents processor 301), and the second subscript represents the time of arrival of the signal which the sample represents (subscript "0" represents time T0). In the same fashion, processor 302 samples the signal at time T0 to produce a sample designated $d_{20}$, where the subscript "2" identifies the second processor element, and the subscript "0" identifies a signal representing a sample received at time T0. Similarly, at the time T0 processor elements 303, 304 and 305 produce samples $d_{30}$, $d_{40}$, and $d_{50}$, respectively. Thus, at the end of the first time interval T0, each processor has available a corresponding sample $d_{n0}$.

During the second time interval T1 illustrated in FIG. 3b, processor 301 transfers its sample $d_{10}$ to processor 302. During the same time interval T1, processor 302 adds together sample $d_{10}$ received from processor 301 with sample $d_{20}$ which was produced by processor 302, to produce a sum signal designated $S_{20}$, representing a sum signal produced by processor 302 related to the signal sample originally received at time T0. During time interval T1, processor elements 303, 304 and 305 hold their samples $d_{30}$, $d_{40}$, and $d_{50}$, respectively.

For purposes of describing downward transfer and processing of a single signal, processor 301 listed in FIG. 3b has by the end of time T1 performed its function, namely the transfer of its received sample $d_{10}$ to processor 302. Consequently, it has no further function after time T1. At time T2, processor 302 transfers the sum signal $S_{20}$, which it generated during time interval T1, to processor 303. Also during time interval T2, processor 303 adds the sample $d_{30}$ which it has been holding to the sum $S_{20}$ which it receives from processor 302, and adds them together to produce a further sum signal $S_{30}$ (the subscript 30 identifies a sum generated by processor 303 which relates to signals originally received at time T0). During time interval T2, processors 304 and 305 hold their respective samples $d_{40}$, $d_{50}$. At the end of time interval T2, processors 301 and 302 have fully performed their functions, and processor 303 has generated $S_{30}$, which represents a combination of signal samples $d_{10}$, $d_{20}$, and $d_{30}$. During the next time interval T3, processor 303 transfers sum signal $S_{30}$ to processor 304. Processor 304 adds the sum signal $S_{30}$ received from processor 303 to its stored sample $d_{40}$ to produce a further sum signal $S_{40}$, representing the sum of samples $d_{10}$, $d_{20}$, $d_{30}$, and $d_{40}$, which were originally sampled at time T0.

Figure 1A:
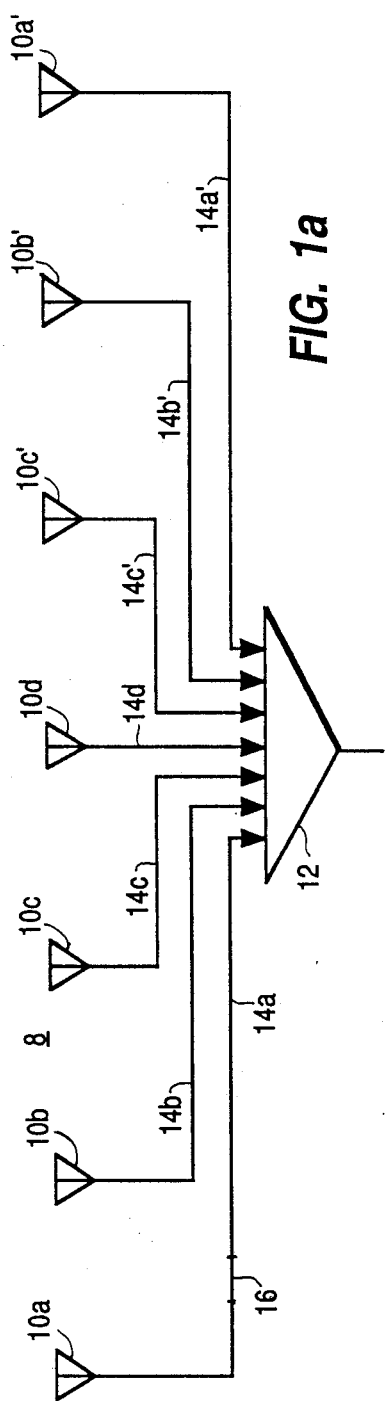
FIG. 1a illustrates a line antenna array.
Figure 1B:
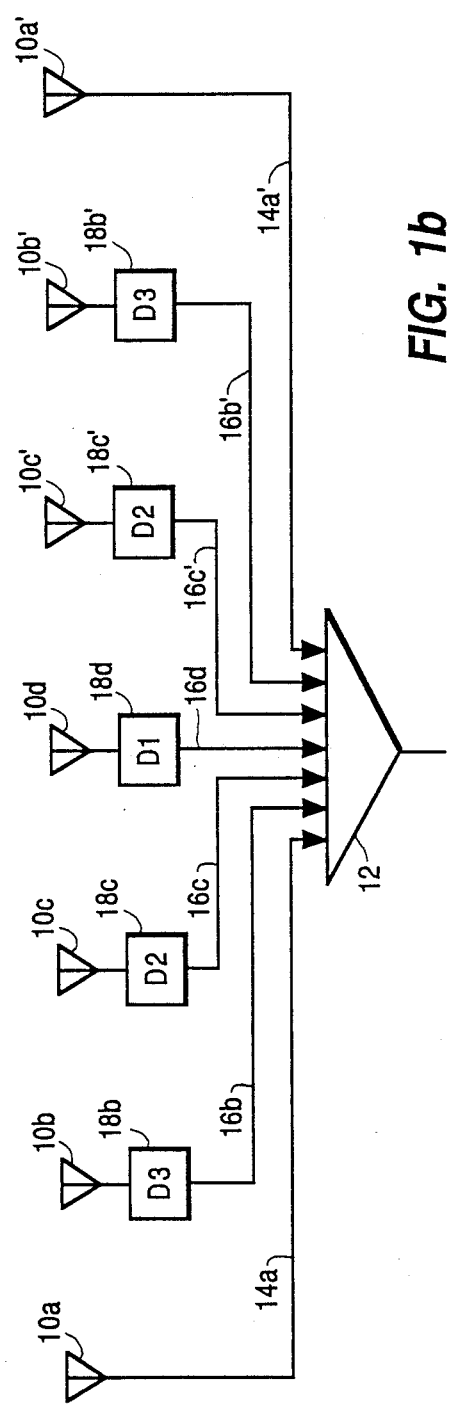
FIG. 1b illustrates an array using delays to compensate for, transmission line path length variations.

At time T4, processor 304 listed in FIG. 3b transfers sum signal $S_{40}$ to processor 305, thereby completing its tasks relating to signals sampled at time T0. Processor 305 adds together its stored sample $d_{50}$ and sum $S_{40}$ to produce a sum signal $S_{50}$ representing a combination of all of the samples taken at time T0. At time T5, processor 305 transfers sum signal $S_{50}$ to its output terminal 48, where it becomes available to combiner 52 of FIG. 2. Thus, the operation described in FIG. 3b samples the signal arriving simultaneously at the antennas, and transfers the signal downward during successive clock intervals, forming partial sums, until the combined signal appears at the bottom. This avoids the need for combining circuits behind the plane of the array as described in conjunction with FIG. 1a or FIG. 1b, and has the advantage of producing combined signals along the edge of the array, rather than at a central location spaced away from the rear face of the array.

The operating cycle of the processors as described in conjunction with FIG. 3 for each sample may be summarized as follows, where S stands for sample, H for hold, A for add and T for transfer:

| | |
|---|---|
| 301 | S T |
| 302 | S A T |
| 303 | S H A T |
| 304 | S H H A T |
| 305 | S H H H A T |

FIG. 4 is a table similar to FIG. 3b, which describes the operation of processors 301–305 in the process of sampling signal and transferring the signal downward. However, FIG. 4 includes further information relating to the processing of a second signal sample taken at a time T2. In FIG. 4, the operations of processors 301–305 during intervals T0 and T1 are identical to those described in conjunction with FIG. 3b. At time T2, however, all the processors produce a second signal sample. Thus, processor 301 has functions to perform after time T1. At time T2, processor 301 produces a sample designated $d_{12}$, processor 302 produces a sample $d_{22}$, and so forth. Processor 305 produces a sample $d_{52}$ at time T2. The functions described in the T2 column of FIG. 4 are identical to the functions in the T2 column of FIG. 3b, with the addition of the taking of a sample by each processor element. At time T3 in FIG. 4, sample $d_{12}$ begins its downward movement by transfer from processor 301 to processor 302. Processor 302 receives sample $d_{12}$ from processor 301 at time T3, and adds to sample $d_{12}$ its own sample $d_{22}$ to produce a sum signal $S_{22}$. It will be recalled that the first subscript 2 represents the processor element generating the sum, and the second 2 in the subscript represents the time at which the sample originated. At time T3, processor 303 performs the same function which it performed in FIG. 3b, namely the transfer of sample $S_{30}$ to next lower processor 304. In addition, processor 303 provides the function of holding sample $d_{32}$ generated at time T2 by processor 303. At time T3, processor 304, in addition to performing the addition function previously provided, provides a holding function for sample $d_{42}$. Processor 305 holds sample $d_{52}$ as well as sample $d_{50}$ through time interval T3.

During time interval T3 of FIG. 4, processor 301 has performed all the functions necessary for the two samples $d_{10}$ and $d_{12}$, and needs to perform no further functions at time T4. Processor 302 transfers sum $S_{22}$ to processor 303 at time T4. Also at time T4, processor 303 adds together sum $S_{22}$ and its stored sample $d_{32}$ to produce a new sum $S_{32}$ at time T4. In addition to the functions previously performed at time T4 by processors 304 and 305, they continue to hold their respective samples $d_{42}$ and $d_{52}$ through time interval T4.

At time T5 in FIG. 4, processor 303 transfers its sum $S_{32}$ to processor 304, and processor 304 adds together its stored sample $d_{42}$ to sum $S_{32}$ to produce a new sum signal $S_{42}$. In addition to transferring sum $S_{50}$ to the output, as in FIG. 3b, processor 305 continues to hold sample $d_{52}$ through time interval T5. At time T6, processor 304 transfers sum $S_{42}$ to processor 305, and processor 305 adds sum $S_{42}$ to sample $d_{52}$ to produce a final sum $S_{52}$. During time interval T7, processor 305 transfers sum $S_{52}$ to its output terminal 48, which is illustrated in FIG. 3a. Consequently, sum signals representing samples taken at times T0 and T2 are generated and transferred from the output of processor 305 at times T5 and T7, respectively.

In the arrangement of FIGS. 3b and 4, the data is sampled at all processor elements 301–305 at the same times, T0 and T2. In the subsequent time intervals, the data and partial sums of each element are processed and passed on to the next lower element, as described, until the final sum is formed. It should be noted that the amount of data being held in a processor varies with the location of the processor in the vertical array, and the holding time of the data also varies with the location of the processor in the array. For example, processor 301 immediately transfers its sample during the time interval following the sampling interval. Consequently, it never holds data, and never contains more than one piece of information. Processor 305, on the other hand, holds each sample for three time intervals. Furthermore, processor 305 holds two samples simultaneously, as for example at time T3. Thus; an array using downward-only processing according to the arrangement of FIGS. 3b or 4 may be disadvantageous, because different modules have different memory requirements. For the case of five arrayed processors used to simplify the explanation, the amount of memory is trivial, but in an actual antenna array many tens or even hundreds of elements may be included in a line array. For such a large array, the differences in the memory holding time and holding amount from element to element may be very significant.

FIG. 5 illustrates the operation of processors 301–305 in a second operating mode. The operation is similar to that of FIG. 3b, except that the processing is delayed by one clock cycle, and the processed samples move from the bottom to the top rather than from the top to the bottom. For example, in FIG. 5, each processor samples the incoming signal at time T1 to produce samples $d_{11}$, $d_{21}$ ... $d_{51}$. At time T2, processor 305 transfers sample $d_{51}$ to processor 304, which adds transferred element $d_{51}$ to its sample $d_{41}$ to produce a sum signal $S_{41}$. Processors 301, 302 and 303 hold their respective samples during time interval T2. During time interval T3, processor 304 transfers sum $S_{41}$ to processor 303, which adds $S_{41}$ to the sample $d_{31}$ which it has been holding, to produce a sum $S_{31}$. Processors 301 and 302 continue to hold their samples during time interval T3. During time interval T4, processor 303 transfers sum $S_{31}$ to processor 302, and processor 302 adds its sample $d_{21}$ to produce sum $S_{21}$. During time interval T5 sum $S_{21}$ is transferred to processor 301, which adds to produce sum signal $S_{11}$. Sum $S_{11}$ is transferred at time T6 to upper output terminal 46 (FIG. 3a) of uppermost processor submodule 301. From uppermost terminal 46 of FIG. 3a, the combined signal is made available to combiner 50 of FIG. 2. In FIG. 5, it can be seen that processor 301 must hold its sample $d_{11}$ for three time intervals, while processor 305 does not hold its sample at all.

The operating cycle of the processor elements as described in conjunction with FIG. 5 for each sample may be summarized as follows:

| | |
|---|---|
| 301 | S H H H A T |
| 302 | S H H A T |
| 303 | S H A T |
| 304 | S A T |
| 305 | S T |

FIG. 6 is similar to FIG. 4, in that two signal samples are taken, but the times at which the samples are taken is offset, just as the sampling time in FIG. 5 is offset from that in FIG. 3b. Also in FIG. 6, the partial signal sums proceeds from bottom to top, as in FIG. 5. The second operating mode should be clear from the preceding discussion and a review of FIG. 6.

Comparing FIGS. 4 and 6, it can be seen that the described operating modes are complementary. For example, in FIG. 4, processor 301 never has any data or samples being held in local memory awaiting the proper time to be included in a partial sum;

| T0 | T1 | T2 | T3 | T4 | T5 |
|---|---|---|---|---|---|
| $S_0$ | $T_0$ | $S_2$ | $T_2$ | $S_4$ | $T_4$ |

Processor 302 also holds no data at any time;

| T0 | T1 | T2 | T3 | T4 | T5 |
|---|---|---|---|---|---|
| $S_0$ | $A_0$ | $T_{s0}$ $S_2$ | $A_2$ | $T_{s2}$ $S_4$ | $A_4$ |

Processor 303 holds data but has only one sample being held at a time;

| T0 | T1 | T2 | T3 | T4 | T5 |
|---|---|---|---|---|---|
| $S_0$ | $H_0$ | $A_0$ $S_2$ | $T_{s0}$ $H_2$ | $A_2$ $S_4$ | $T_{s2}$ $H_4$ |

Further, processor 304 also holds data samples, but holds only one data sample at a time;

| T0 | T1 | T2 | T3 | T4 | T5 |
|---|---|---|---|---|---|
| $S_0$ | $H_0$ | $H_0$ $S_2$ | $A_0$ $H_2$ | $T_{s0}$ $H_2$ $S_4$ | $A_2$ $H_4$ |

Finally, processor 305 holds data samples, but two samples are held simultaneously;

| T0 | T1 | T2 | T3 | T4 | T5 |
|---|---|---|---|---|---|
| $S_0$ | $H_0$ | $H_0$ $S_2$ | $H_0$ $H_2$ | $A_0$ $H_2$ $S_4$ | $T_{s0}$ $H_2$ $H_4$ |

Contrariwise, in the operating mode illustrated in FIG. 6, processors 304 and 305 never have any data being held, while processor 303 holds one data sample, processor 302 one sample, and processor 301 has two samples of data being held at any one time.

If the operating modes illustrated in conjunction with FIGS. 4 and 6 are combined, data samples of the set taken at time T0 are added in an arrangement in which partial sums are formed by passing the data to the next lower neighbor, while the set of samples taken at time T1 is transferred to the neighbor above. The amount of data being held in memory of each processor is a combination of the requirements for each operating mode. The memory requirements placed on the processors are equalized, in that the number of signals held in each processor during each cycle is the same. Further, the holding time of the signals which are held occur in complementary pairs.

The pattern and holding times for signals taken at times $T_1$, $T_3$, $T_5$, etc. (i.e. the odd numbered data points) are the same for processor 301 of FIG. 6 as are the pattern and holding times for signals taken at times $T_0$, $T_2$, $kT_4$, etc. (i.e. the even numbered data points) for processor 305. Likewise, the same is true for processors 302 and 304. Only the center processor, 303, has a distinctly different pattern (because it has no complementary pair). These complementary patterns and holding times occur in processor 301 for the downward movement of data and for processor 305 for the upward movement of data. Additionally, the pattern and holding times that occur in processor 301 for the upward movement of data are the same pattern and holding times that occur in processor 305 for the downward movement of data. Examination of the patterns and holding times for processors 302 and 304 will show that here, as well, there are two patterns and holding time sets that each element has which the other one also has.

Topmost processor 301 in FIG. 6 never has an even-numbered data sample to store, because the even-numbered data samples are transferred to the next lower processor immediately for generating a partial sum. On the other hand, processor 301 must store two odd numbered samples until they are used to generate a sum. For example, sample $d_{11}$ taken at time T1 is held for summing at time T5, and sample $d_{13}$ taken at time T3 is held until a later time T7. The sample which would be taken by processor 301 at time T5 (not appearing in FIG. 6) will also be held in the memory of processor 301, but enters the memory during the same time interval in which the sample taken at time T1 leaves the memory.

FIG. 7 illustrates the combined processes described in conjunction with FIGS. 4 and 6, on a continuous basis with samples being taken during each time interval. The number N of data samples which are stored in memory at any one time is equal to:

$$N = ((n-1)/2) \qquad (1)$$

for all processors, where n is the number of elements in a set. For example, for an array of five processors as described in conjunction with FIGS. 3–7, the number of data samples in the store of each processor is two.

For the case of five processors, equation (1) indicates that the number of samples stored is two. This can easily be seen by noting the pattern in FIG. 7 for processor 303;

| T0 | T1 | T2 | T3 | T4 | T5 | T6 | T7 |
|----|----|----|----|----|----|----|----|
|    |    |    |    |    |    |    | $S_7$ |
|    |    |    |    |    | $S_5$ | $H_5$ | $A_5$ |
|    |    |    | $S_3$ | $H_3$ | $A_3$ | $T_{s3}$ |    |
|    | $S_1$ | $H_1$ | $A_1$ | $T_{s1}$ |    |    |    |
| $S_0$ | $H_0$ | $A_0$ | $T_{s0}$ |    |    |    |    |
|    |    | $S_2$ | $H_2$ | $A_2$ | $T_{s2}$ |    |    |
|    |    |    |    | $S_4$ | $H_4$ | $A_4$ | $T_{s4}$ |
|    |    |    |    |    |    | $S_6$ | $H_6$ | in which only one sample is held (H) at any time after start-up. Similarly, for a seven-processor system, equation (1) indicates that the number of samples stored is three. This can be verified by noting the pattern for the fourth or center processor;

| T0 | T1 | T2 | T3 | T4 | T5 | T6 | T7 | T8 | T9 |
|----|----|----|----|----|----|----|----|----|----|
|    |    |    |    |    |    |    |    |    | $S_9$ |
|    |    |    |    |    |    | $S_7$ | $H_7$ | $H_7$ |    |
|    |    |    |    | $S_5$ | $H_5$ | $H_5$ | $A_5$ | $T_{s5}$ |    |
|    |    | $S_3$ | $H_3$ | $H_3$ | $A_3$ | $T_{s3}$ |    |    |    |
|    | $S_1$ | $H_1$ | $H_1$ | $A_1$ | $T_{s1}$ |    |    |    |    |
| $S_0$ | $H_0$ | $H_0$ | $A_0$ | $T_{s0}$ |    |    |    |    |    |
|    | $S_2$ | $H_2$ | $H_2$ | $A_2$ | $T_{s2}$ |    |    |    |    |
|    |    |    | $S_4$ | $H_4$ | $H_4$ | $A_4$ | $T_{s4}$ |    |    |
|    |    |    |    |    | $S_6$ | $H_6$ | $H_6$ | $A_6$ |    |
|    |    |    |    |    |    |    | $S_8$ | $H_8$ |    | in which three samples are held at any time.

It should be particularly noted that this arrangement can only operate in the described manner with an odd number of processors, and cannot be so operated for an even number of processors. Furthermore, if the number of processors were to be even, the times at which partial sums would be formed at each processor element would be the same for both even and odd numbered samples. Consequently, an even number of processors would require multiple additions to be performed simultaneously in each processor, with an increase in the complexity of the processing. Thus, an even number of samples increases the amount of hardware required by comparison with an odd number of samples. In effect, alternating the direction of the signal flow between processors on alternate samples reduces the data rate by one half. This can be appreciated by noting that the sum signal is transferred from the uppermost terminal 46 or from the lowermost terminal 48 of each column 34 of modules 32 only every other clock cycle, even though samples are taken at every clock cycle.

As so far described, upper and lower partial sums are generated by transferring data upward and downward during alternate time or clock intervals. In order to perform useful antenna beam forming, however, all the data must be combined. Consequently, it is necessary to combine the data flowing from upper terminal 46 and lower terminal 48 of each vertical column of modules.

Figure 8B:
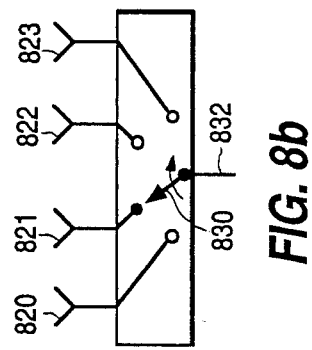
FIG. 8b illustrates a multiplexer coupled to the four terminals for producing a combined signal at full data rate.
Figure 8A:
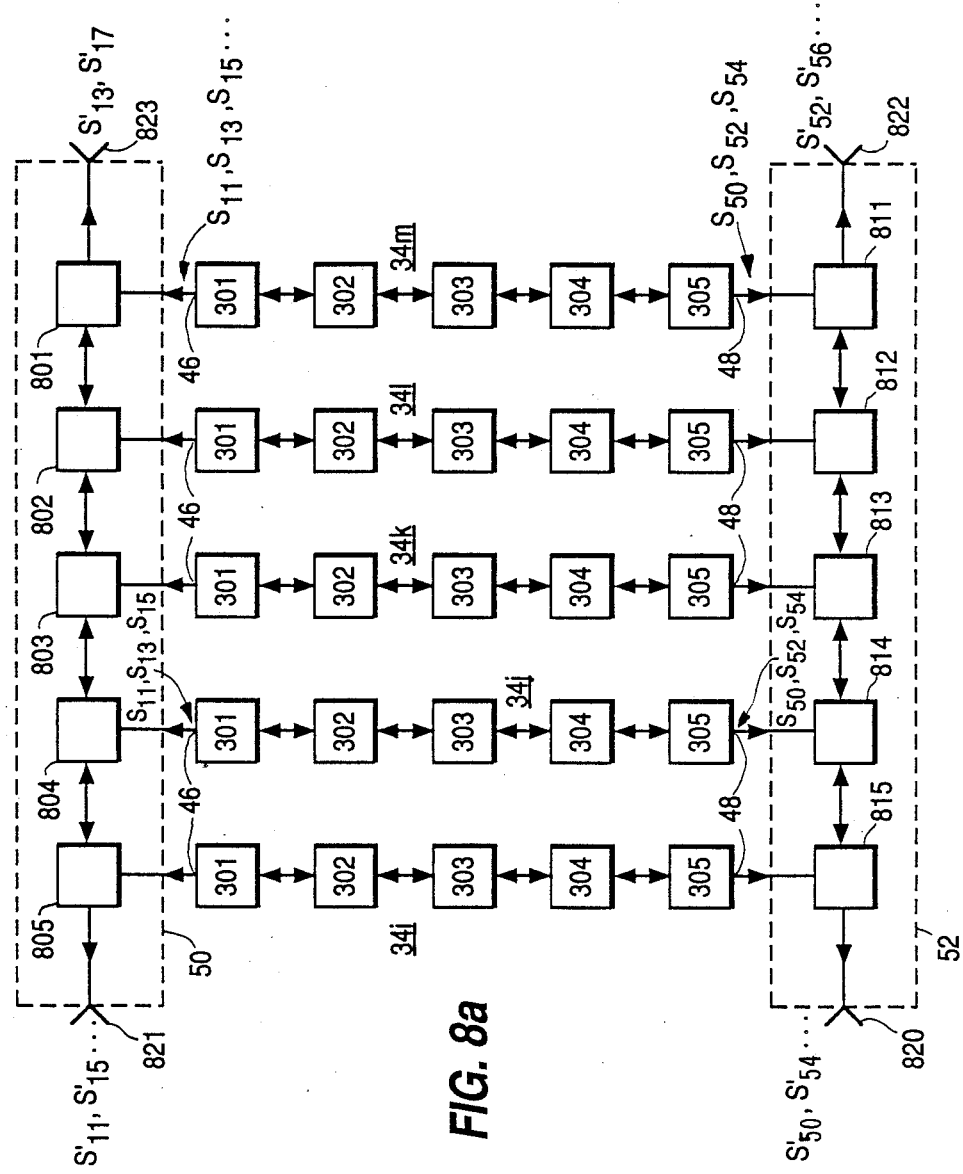
FIG. 8a illustrates in block diagram form a horizontal array of vertical column arrays, together with a pair of upper and lower combiners, each in the form of a horizontal line array, for producing a stream of signals at ¼ data rate at each of four terminals.

FIG. 8a illustrates five vertical column arrays 34 such as are illustrated in FIG. 2, designated 34i, 34j, 34k, 34l and 34m. Each vertical array 34 as illustrated in FIG. 8a includes five blocks, which represent processors 301 through 305. The operation of each of such vertical line arrays is described above in conjunction with FIGS. 3–7. FIG. 8a also illustrates combiner or summing circuit 50 connected to upper input/output terminals 46 of processors 301 of vertical line arrays 34i–34m. Within combiner 50, an adder/transfer unit is associated with each vertical line array, and are themselves connected in a line array. In particular, an adder/transfer element 801 is connected to terminal 46 of processor 301 of line array 34m, a similar adder/transfer unit 802 is connected to upper terminal 46 of processor 301 of vertical line array 34l, and so forth. Also, one port of adder/transfer unit 801 is connected to a terminal 823 of combiner 50, and another input/output port is connected to an input/output port of adder/transfer unit 802. Adder/transfer units 803, 804 and 805 are similarly interconnected, and the last input/output terminal of adder/transfer unit 805 is coupled to an output port 821 of summing circuit 50.

At the bottom of FIG. 8a, combiner 52 includes output ports 820 and 822, with a further line array of adder/transfer units 811–815 coupled therebetween and to lower terminals 48 of processors 305 of vertical line arrays 34i–34m.

As mentioned, sum signals appear at upper terminals 46 of each vertical line array 34 of FIG. 8a during every other clock cycle, and sum signals appear at lower terminals 48 of the vertical line arrays during every other alternate clock cycle. In general, horizontal line arrays of adder/transfer units 801–805 operate in a manner substantially identical to that described in conjunction with FIGS. 3–7. The most important difference between the operation of the vertical line array as so described and the horizontally-disposed array of summing/transfer units 801–805 is that the vertical line arrays of processing elements 30 sample the arriving signal during each clock cycle, producing outputs at the end terminals 46 and 48 during alternate clock cycles, whereas input signals are available to adder/transfer units 801–805 only during alternate clock cycles, whereby a complete cycle of operation requires four clock cycles.

Referring to FIG. 7, sum $S_{50}$ is generated at time T4, and at time T5 is transferred by lower processor 305 to its lower output terminal 48. During time T6, sum $S_{11}$ is transferred by each processor 301 to its upper output terminal 46. During time T7, sum $S_{52}$ is transferred to the lower output terminal 48. During a next following time interval T8 (not illustrated in FIG. 7), a further sum $S_{13}$ would be transferred to the upper output terminal 46.

In FIG. 8a, the sums $S_{50}$ are simultaneously transferred from lower processor elements 305 into lower adder/transfer units 811–815 during time T5 of FIG. 7. They then begin to be summed or transferred toward the left during the next several clock cycles, forming partial sums along the way. Since sums $S_{50}$ become available to the adder/transfer units 811–815 only every other clock cycle, the transfer of data from one adder/transfer unit to the next occurs only every two clock cycles. Transfer of data through a horizontal line array of five adder/transfer units, which would take six clock cycles if transfers were as fast as those described in conjunction with FIG. 7, actually takes 12 clock cycles. Thus, twelve clock cycles after the transfer of sums $S_{50}$ into lower combiner 52, a sum of all the $S_{50}$ signals appears at left output terminal 820 of lower combiner 52. This sum is denominated $S'_{50}$, and represents the sum of all the samples taken at time T0 by all the processing units 30 of all the vertical line arrays 34$i$–34$m$ illustrated in FIG. 8a. As mentioned, the samples taken at time T1 appear at time T6 at the top of each vertical line array as a sum $S_{11}$. At time T6 of FIG. 7, therefore, a sum signal $S_{11}$ appears at the upper terminals 46 of all the vertical line arrays 34$i$–34$m$ of FIG. 8a, and is transferred into the associated one of adder/transfer units 801–805 of upper combiner 50. During the next succeeding twelve clock intervals, the partial sums are added towards the left in the adder/transfer units of combiner 50, producing a total sum signal $S'_{11}$ at left output 821. Thus, during that clock cycle after the one in which complete sum $S'_{50}$ appears at output terminal 820, a complete sum $S'_{11}$ appears at upper left output terminal 821, representing the sum of all the samples taken at time T1 of FIG. 7.

At time T7 of FIG. 7, sum signals $S_{52}$ are transferred to the lower output of all processing units 305, and are made available to adder/transfer units 811–815 of lower combiner 52 of FIG. 8a. These are sequentially added to the right, forming partial sums, until a time twelve clock cycles later, at which time a complete sum $S'_{52}$ is generated at lower right output terminal 822. Complete sum $S'_{52}$ represents the sum of all the samples taken at time T2 by all the processing elements 301–305 of all the vertical line arrays 34$i$–34$n$. Lastly, during the above mentioned time T8 (not illustrated in FIG. 7), further samples $S_{13}$ are made available from upper terminals 46 of line arrays 34$i$–34$m$, and are coupled into upper adder/transfer units 801–805 (FIG. 8a). These are sequentially transferred to the right, appearing as a complete sum $S'_{13}$ at terminal 823, representing all the samples taken at time T3. Thus, the complete operation of the arrangement of FIG. 8a occurs over a cycle of four clock pulses as described in conjunction with FIG. 7, with generation of complete sums at output terminals 820, 821, 822 and 823, in a repeating sequence.

As so far described, complete signals representing all the samples taken at one particular time appear in sequence at four output terminals at the four corners of the rectangular array. In order to produce a complete data stream, a multiplexer illustrated in FIG. 8b is used, which interconnects with terminals 820, 821, 822, and 823 of FIG. 8a. A single pole, four throw switch illustrated as 830 sequentially samples the signals at the four ports as they become available on a recurrent four-clock-cycle basis, and couples the signals onto a conductor 832. Thus, the signal on conductor 832 represents a continuous stream of sums, each of which represents a combination of all the signals sampled at a particular time by the rectangular array of FIG. 8a. The data rate of the processing is decreased over ordinary sequential addition, as may be readily understood by noting that a sum S' appears at each output terminal only every fourth clock pulse.

Figure 9:
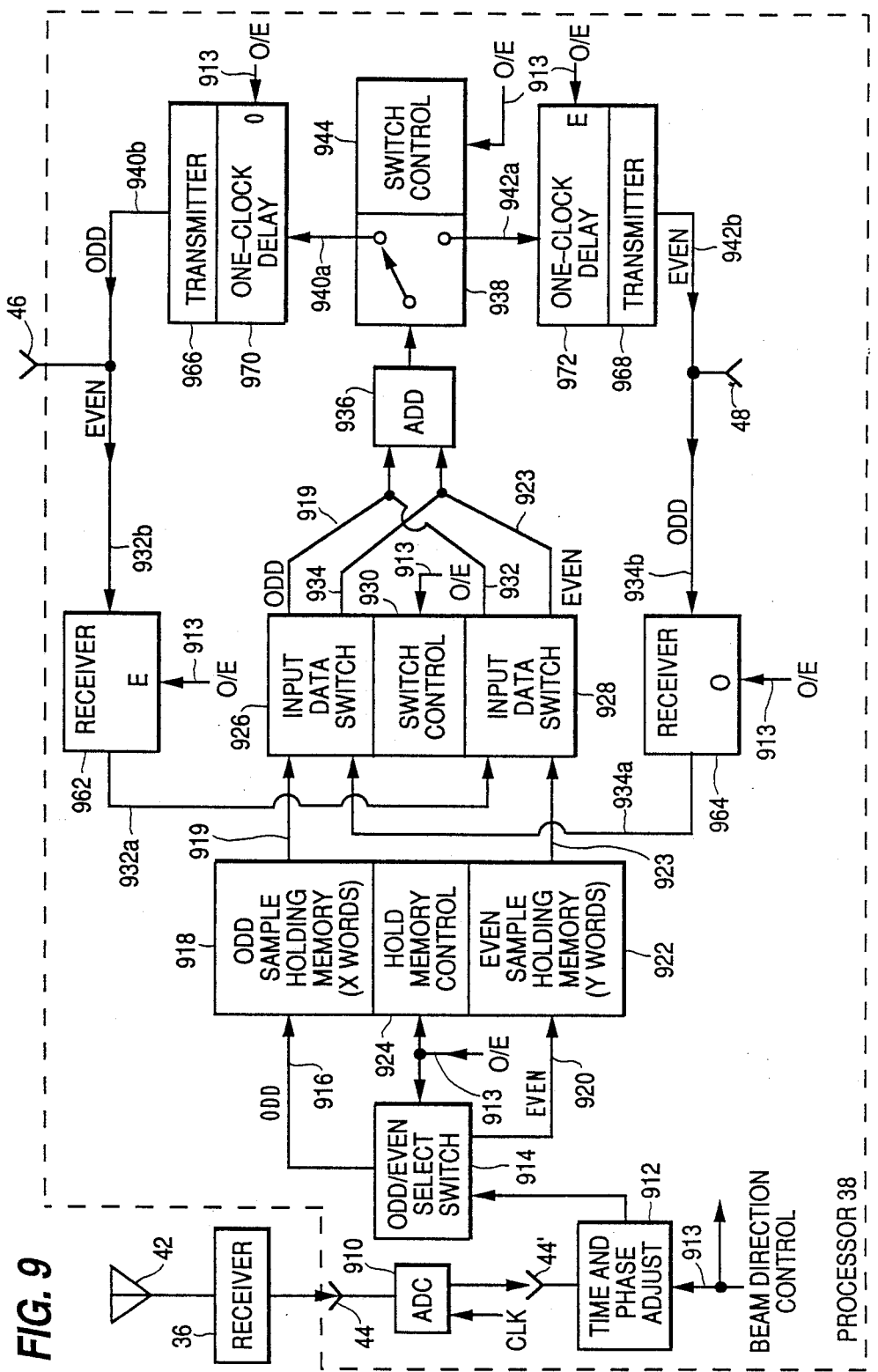
FIG. 9 is a simplified block diagram of a receive signal processor submodule, including an input port for receiving signals from its antenna submodule, upper and lower input/output ports for coupling signals being processed vertically to adjacent signal processor submodules, a memory for storing signals, an adder for adding signals; and circuits adapted for routing of the signals being processed depending upon the position of the processor in the array.

FIG. 9 is a simplified block diagram of a portion of a module 32, and in particular of a processor 38 of FIG. 2. In FIG. 9, elements corresponding to those of FIGS. 2 and 3 are designated by the same reference numerals. In FIG. 9, antenna 42 is coupled to receiver 36, and receiver 36 is coupled by connector 44 to an analog-to-digital converter (ADC) 910, which samples the incoming signal in response to clock (CLK) signals. The clock signals may occur at a high enough frequency so that many samples are taken during each cycle of the radio-frequency (RF) signal received at antenna 42. Thus, the samples are sufficient to determine the amplitude and phase of the received RF signal. The signals from ADC 910 are applied to a time and phase adjustment block 912. A connector illustrated as 44' indicates an alternate location for connector 44, which alternate location, if used, would make ADC 910 a part of receiver 36.

Time and phase adjustment block 912 provides controlled time delays and phase shifts, and amplitude weighting for two purposes. The first purpose is to compensate for time delays and phase shifts among the various receiver submodules 36 of the system of FIG. 2. While the nominal or average amplitude response, time delay and phase shift of the receivers 36 of array 28 of FIG. 2 are known, the deviations from the average for each particular processor must be compensated. Such compensation is well known and may be programmed into each processor 38 at the time at which it is mated with a receiver 36. If desired, a ROM associated with receiver 36 may be preprogrammed with the amplitude, time delay, and phase shift information, which ROM can be read by the processor 38 with which it is mated to provide appropriate correction. This would allow any receiver to be mated with any processor, which would be convenient for maintenance and operational reliability purposes.

The second purpose of time delay and phase shift block 912 of FIG. 9 is to receive beam direction control signals over a conductor 913, and to implement the appropriate delays, shifts and amplitude control required so that, when the signals are ultimately summed, the return from a selected direction is maximized (the beam is pointed in the desired direction). Such time delays and phase shifts are notorious in the array antenna arts and need not be explained in detail. The amplitude weighting or control determines the sidelobe level of the antenna beam.

The digitized delayed and phase shifted signals at the output of time and phase adjust block 912 are applied to an odd/even selection switch 914. Switch 914 responds to a global synchronization odd/even control signal (O/E) which switches at the clock rate, and couples the odd signals by way of a conductor 916 to an odd sample holding memory 918 during O/E conditions, and couples the even signals by way of a conductor 920 to an even sample holding memory 922.

Memories 918 and 922 are simple FIFO memories, which are clocked by a hold memory control 924 during odd and even clock cycles, respectively. The total amount of memory in odd memory 918 and even memory 922 is given by Equation (1). While the total magnitude of the memory is defined by Equation (1), the allocation of memory amounts between even and odd depends upon the location within the array at which the particular processor is placed. If hard-wired memory is used, the allocation may be predetermined based upon the array location for which the particular processor is intended. Additional freedom in placement and maintenance is provided if the memory allocation is dynamically made to depend upon the array location at which it happens to be inserted. This may be accomplished by coding a multielement terminal (not illustrated) associated with the backplate (not illustrated) of the array of FIG. 2 so as to include information about the position of the particular terminal. Then, when the modules 32 of FIG. 2 are placed in the array, the power and control submodule 40 (FIG. 2) can read the location, and pass signals to processor 38 to configure the memory for the appropriate allocation. Details of such dynamic reconfiguration are not necessary to an understanding of the invention but will be apparent to those skilled in the art of digital signal processing.

Odd sample holding memory 918 reads its signals by way of a conductor 919 to a first input of a first data switch 926 during each odd clock cycle. Similarly, even sample holding memory 922 reads its signals by way of a conductor 923 to a first input of a second input data switch 928 during even clock intervals. A second input of first input data switch 926 is coupled by a conductor 934a, a receiver 913 and a conductor 934b to lower input/output terminal 48. A second input of second input data switch 928 is coupled by a conductor 932a, a receiver 962 and a conductor 932b to upper input/output terminal 46. Input data switches 926 and 928 are essentially gates which couple their respective input pairs to the inputs of adder 936 under the control of switch control 930, which in turn is controlled by O/E signal received over conductor 913. During odd clock pulses, input data switch 926 is enabled and couples the odd local data by way of conductor 919 to a first input of adder 936, and switch 926 together with enabled receiver 964 also couples a partial sum signal by way of conductors 934a and 934b to a second input of adder 936. During even clock pulses, input data switch 928 and receiver 962 are enabled, and couple a local signal by way of conductor 923 to a first input of adder 936 and a partial sum by way of conductor 932a and 932b to a second input of adder 936.

Adder 936 receives at its input terminals a local signal together with a partial sum during each clock cycle. Adder 936 adds together the signals to produce a new partial sum, which is applied by way of a conductor 937 to an output switch 938, illustrated in its odd clock cycle position. Output switch 938 couples the odd partial sums, such as $S_{51}$, $S_{53}$ . . . of FIG. 7 to conductor 940a and the even partial sums, such as $S_{50}$, $S_{52}$ . . . of FIG. 7, to conductor 942a. The odd partial sums coupled by switch 938 to conductor 940a are written into a one-clock-cycle delay element 970 during the odd clock pulses, and read therefrom during the next odd clock pulse. When read from delay 970, the odd partial sums are applied to a transmitter 966 which transmits the partial sum to input/output terminal 46; at this odd time receiver 962 is disabled. Similarly, even partial sums generated by adder 936 during even cycles are coupled by way of switch 938 in its alternate position (not illustrated) and are written into one-clock delay 972. They are read from delay 972 during the next following even cycle, and transmitted by transmitter 968 over conductor 942b to input/output terminal 48; at this even time, odd-cycle receiver 964 is disabled. The overall operation of processors 38, therefore, accepts partial sums from lower input/output terminal 48 during odd cycles, and forms a new partial sum, at the same time transmitting the last odd partial sum by way of upper input/output terminal 46, and storing the current new partial sum for later transmission. During even cycles, the same process takes place in a downward direction.

It is readily understandable that a failure in input data switch 926, input data switch 928, switch control 930, adder 936, switch 938 or controller 944 of FIG. 9 may prevent some or all partial sums from being generated. In the context of the vertical line arrays of FIGS. 2 or 3, this could result in slight or gross errors in the sums arriving at the top or bottom of the line array. If the failed processor is adjacent the upper output, the upward-moving odd sum could be totally lost, while the bottom downward-moving even sum would be almost unaffected. A failure in a processor located near the center of the line array could result in a grossly erroneous sum at both top and bottom of the line array.

Figure 10:
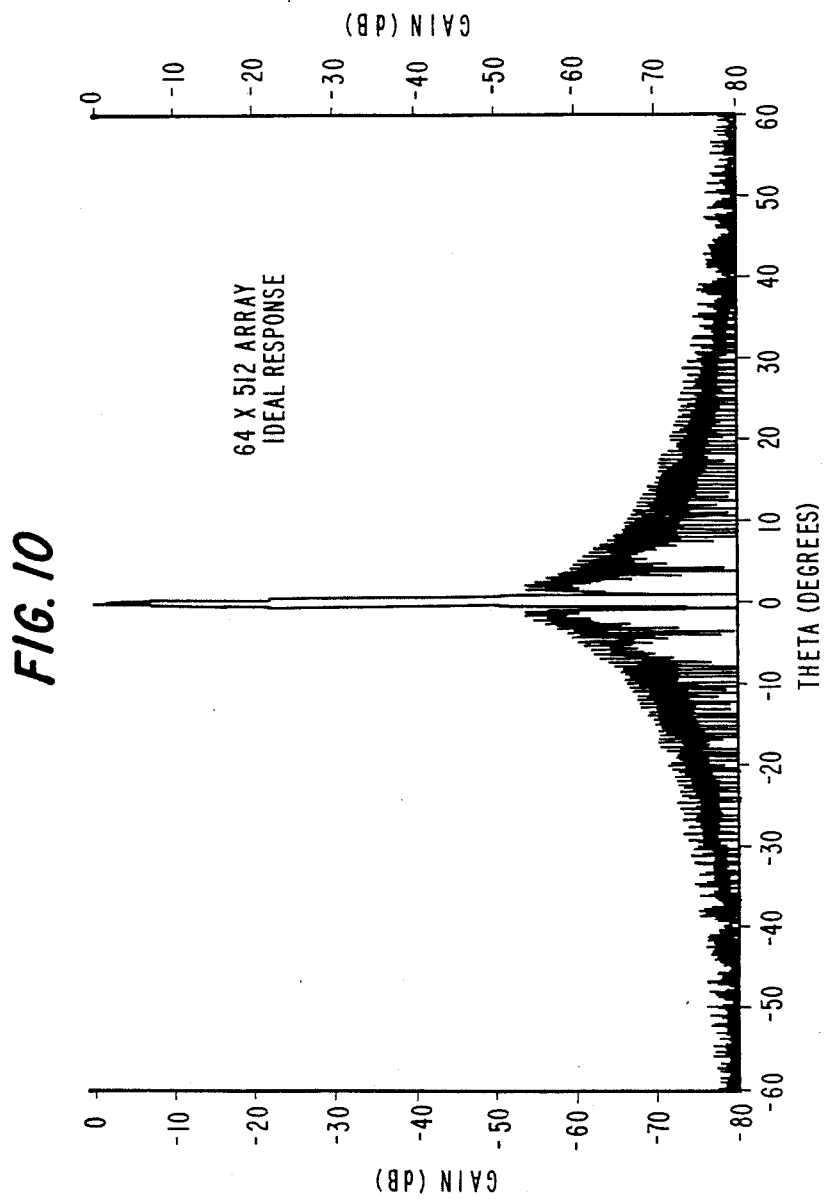
FIG. 10 is an antenna pattern for an ideal array.

FIG. 10 represents the azimuth radiation pattern of a 64×512 element array of antennas (512 columns, each of 64 antennas and processors) without failures. The main beam has 0 dB reference response, and the near-in sidelobes have a peak value of about −50 dB relative to the main lobe. While the pattern for a 64-element column is illustrated, the pattern for the preferred 63 or 65-element column will be very similar.

Figure 11:
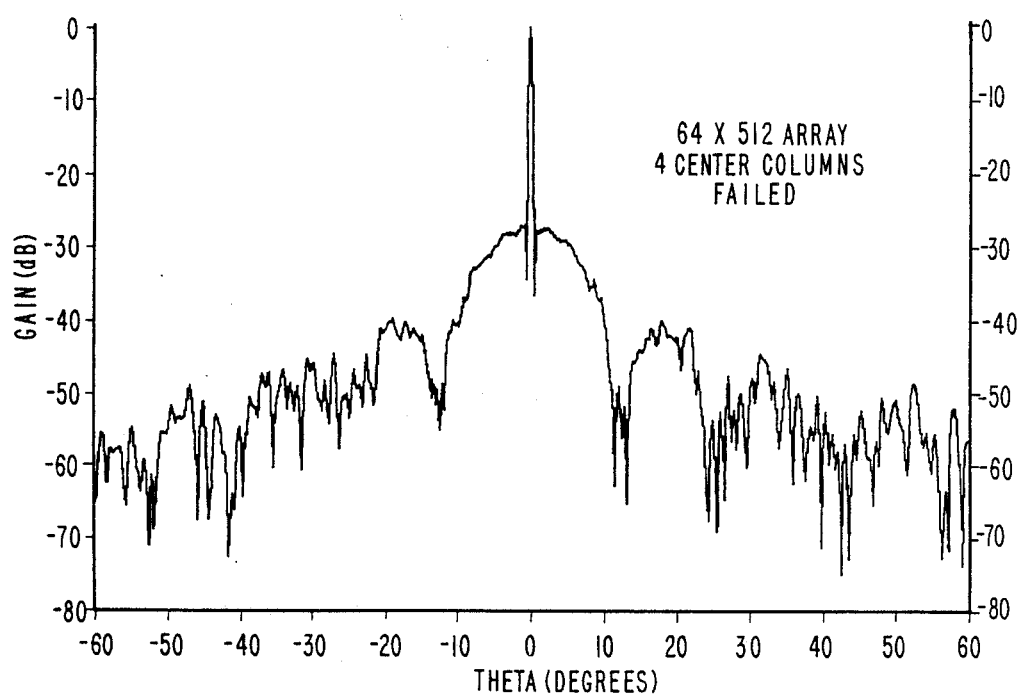
FIGS. 11 and 12 are antenna patterns for arrays with failed columns.
Figure 12:
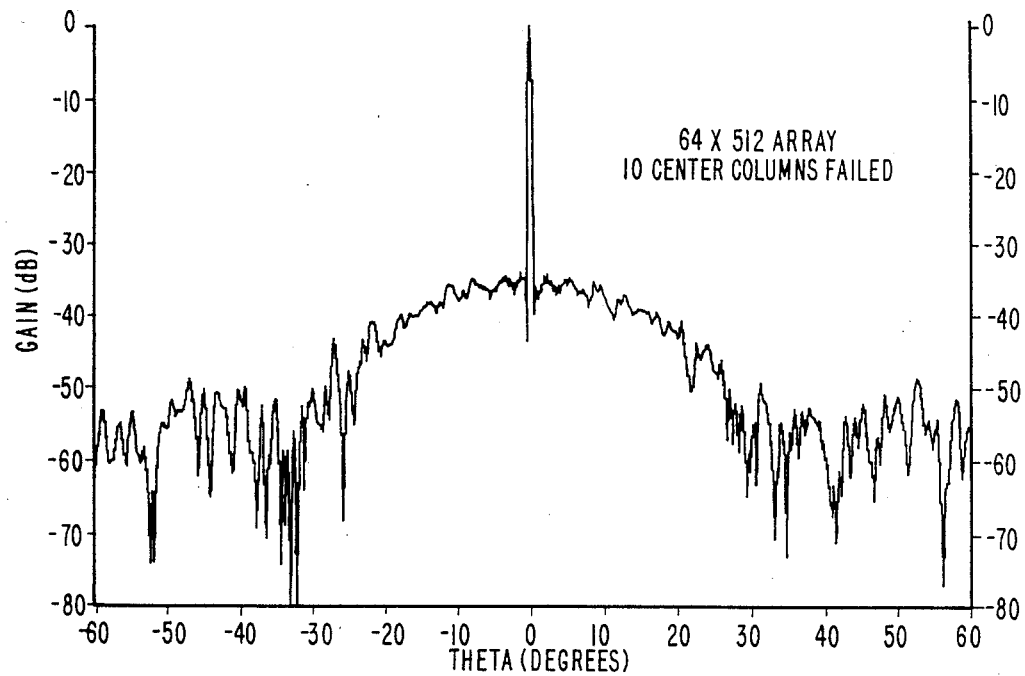

FIG. 11 represents the radiation pattern of the same array with four central columns failed or not contributing to the radiation pattern; the sidelobe level is increased relative to that of FIG. 10 by about 30 dB. FIG. 12 represents the antenna radiation pattern with 10 center columns failed. The average sidelobe level does not exhibit near-in nulls. The radiation patterns with failed columns are disadvantageous for surveillance use, because of the potential susceptibility of jamming, and reduced target detection capability and tracking accuracy.

Diagnostic systems (not illustrated) determine the existence of a fault in a particular processor. Such diagnostics may involve the insertion of test signals into each column, and operating the adders while monitoring the partial sums to verify their systolic progress. Test signals may be applied to the antennas or to input ports 44 (FIG. 2), and the sums may be monitored. Such diagnostic systems are well known and their details will be well known to those skilled in the art. Consequently, it is assumed that the location and nature of a fault are known.

A measure of fault tolerance might exist if a failed adder were bypassed by a processor which averaged the sample values of the next upper and lower modules. However, this tends to correlate the noise therein and degrades the noise performance. Analysis indicates that addition of a random number or of zero signal at the failure location provides better performance. According to an aspect of the invention, a failed processor in a column is bypassed, a zero is added to the partial sum, the partial sum is delayed and transmitted to the next functional processor in the same column.

Figure 13:
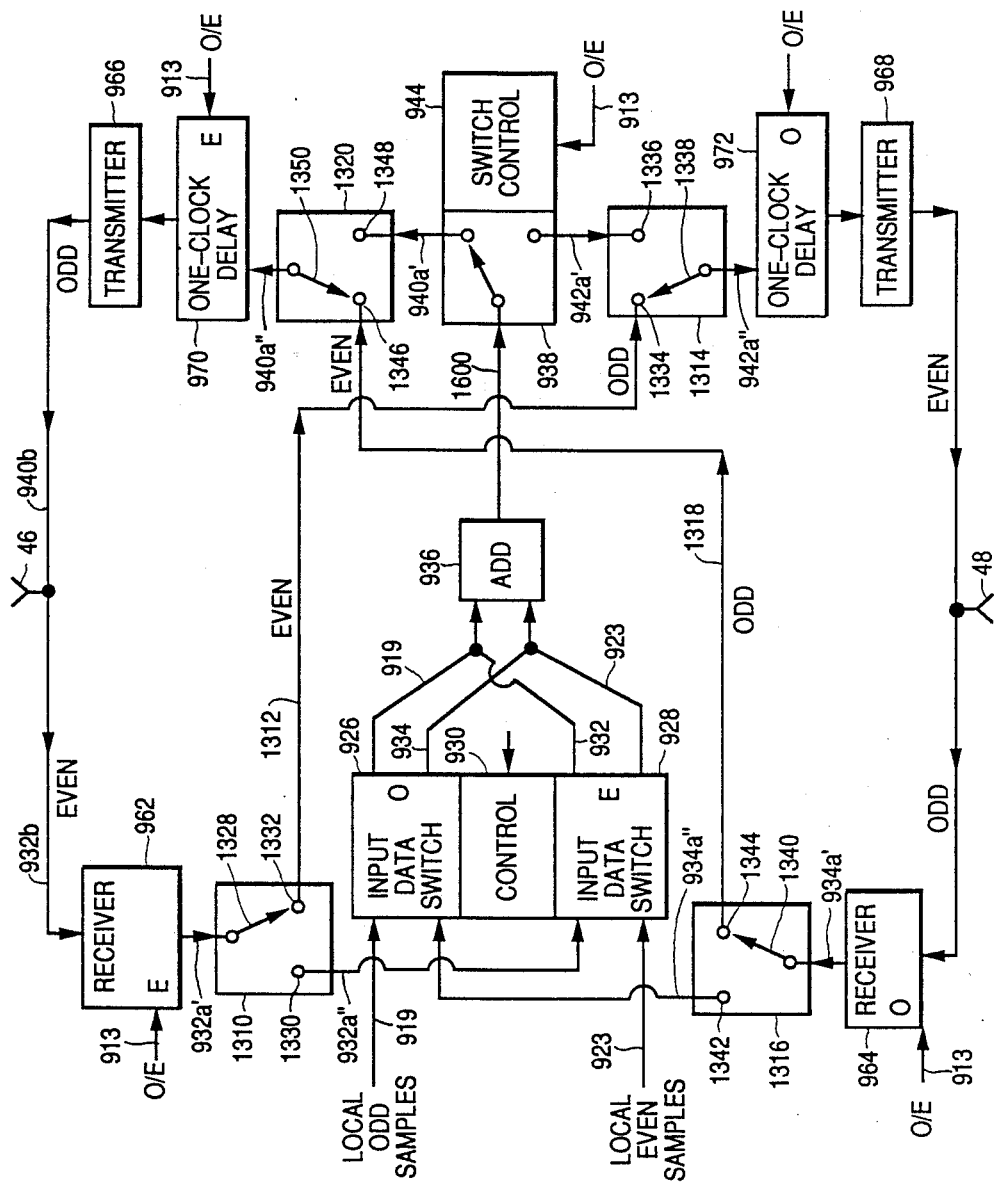
FIG. 13 is a simplified block diagram of a systolic processor capable of bypassing signal around a failed adder.

FIG. 13 is a simplified block diagram of a portion of processor 38 of FIG. 9, with modifications for simple fault circumvention. Elements of FIG. 13 corresponding to those of FIG. 9 are designated by the same reference numbers. In FIG. 13, the downward-moving even samples received by receiver 962 are applied by a first portion 932a' of conductor 932a to a single-pole, double-throw switch (SPDT) 1310, illustrated in its fault-bypass state. The normal-condition pole 1330 of switch 1310 is connected by way of portion 932a" of conductor 932a to an input of switch 928. The fault-condition pole 1332 of switch 1310 is connected by a conductor 1312 to the fault-condition pole 1334 of a SPDT switch 1314. The normal-condition pole 1336 of switch 1314 is connected by way of a conductor portion 942a' to switch 938, and movable element 1338 of switch 1314 is connected by way of conductor portion 942a" to one-clock delay 972. The upward-moving odd samples received by receiver 964 are applied by way of portion 934a' of conductor 934a to the movable portion 1340 of a SPDT switch 1316, illustrated in its fault-bypass state. The normal-condition pole 1342 of switch 1316 is connected by way of portion 934a" of conductor 934a to an input of switch 926. The fault-condition pole 1344 of switch 1316 is connected by a conductor 1318 to the fault-condition pole 1346 of a SPDT switch 1320. The normal-condition pole 1348 of switch 1320 is connected by way of portion 940a' of conductor 940a to switch 938. Movable element 1350 of switch 1320 is connected by portion 940a" of conductor 940a to delay 970.

It is clear that, with the movable elements (1328, 1338, 1340, 1350) of switches 1310, 1314, 1316 and 1320 connected to their normal-operation poles (1330, 1336, 1342, 1348), the arrangement of FIG. 13 is configured exactly in the same manner as FIG. 9, and operates in the same fashion.

When the diagnostics (not illustrated) detect a failure of input date switches 926 or 928, or of adder 936, fault switches 1310, 1314, 1316 and 1320 are thrown the fault condition, which is the condition illustrated in FIG. 13. In the fault condition, upward-moving odd partial sums are received by receiver 964 and are routed directly, by way of switch 1316, conductor 1318 and switch 1320, to delay 970. The partial sums arrive at delay 970 at the same time that a new partial sum would arrive, if adder 936 were functional. Delay 970 writes in the partial sum from the next lower processor, just as though it were a new partial sum. In effect, it stores the partial sum from the next lower processor with the addition of a zero. During the next following odd clock pulse, the unmodified partial sum is transmitted to the next upper processor for further systolic processing. During even cycles, in a similar manner, the downward-moving even partial sums received by receiver 962 are routed by way of switch 1310, conductor 1312 and switch 1314 to delay 972. The downward moving even partial sums are similarly re-transmitted down to the next processor during the next following even clock cycle, effectively adding zero.

While the adder bypass scheme described in conjunction with FIG. 13 can mitigate some internal problems in a processor, the entire submodule can fail, as by losing its power source. This would completely block the passage of any signals therethrough.

Figure 14:
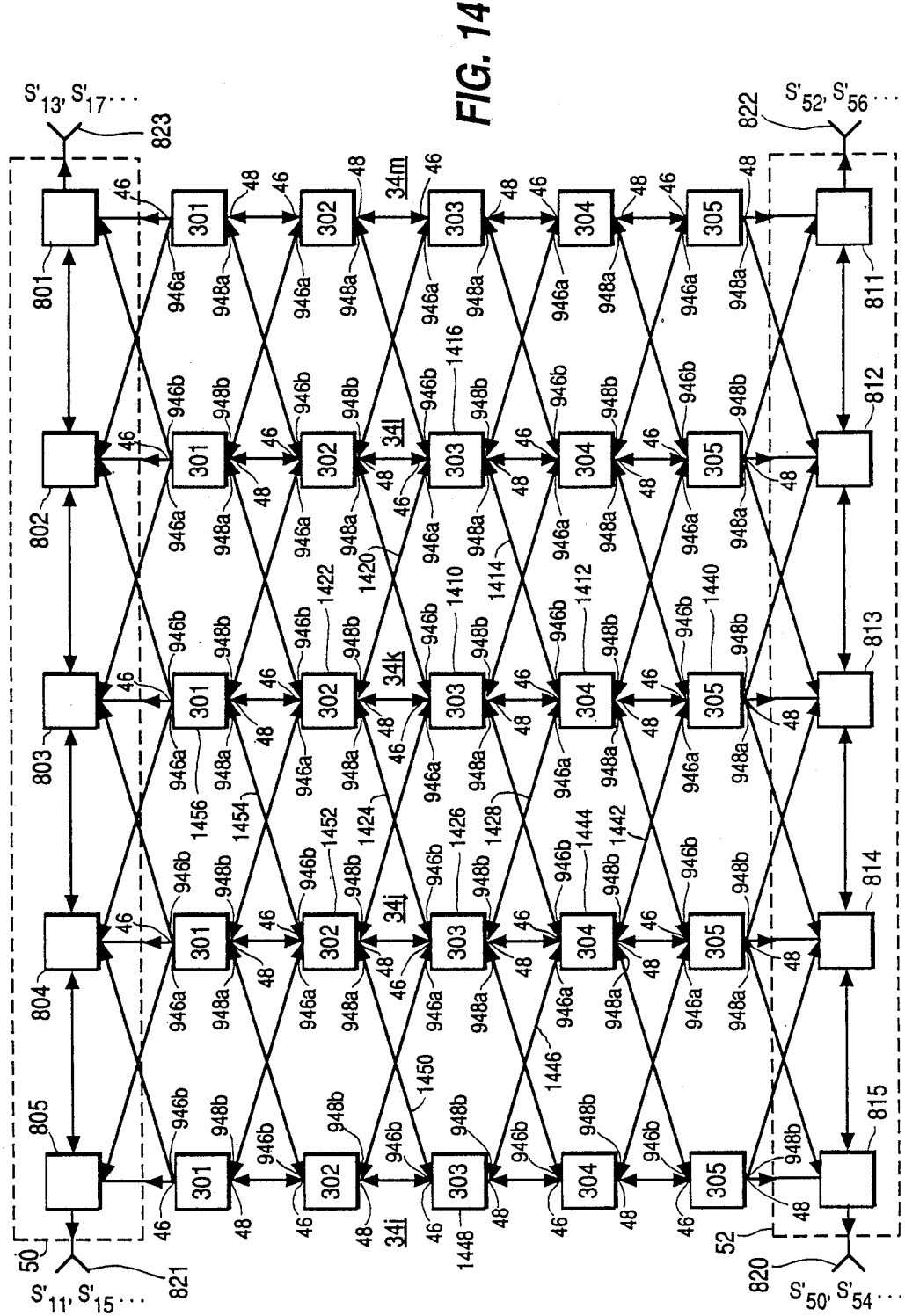
FIG. 14 is a simplified block diagram of a two-dimensional systolic array including paths by which signal can bypass a failed element.

FIG. 14 illustrates an array similar to that of FIG. 8a, including additional signal flow paths associated with bypassing of signals around a failed processor. Elements of FIG. 14 corresponding to those of FIG. 8a are designated by the same reference numerals. As illustrated in FIG. 14, each processor includes a main upper input-/output terminal designated 46, and also includes auxiliary upper input/output terminals 946a and 946b. Also, each processor includes a main lower input/output terminal 48, and two auxiliary lower input/output terminals designated 948a and 948b, all as described in more detail below. The upper input/output terminals 46, 946a, 946b of each processor are coupled to the lower input/output terminals 48, 948b, 948a, respectively, of a processor of the next higher rank or to the upper column combiner 50. In particular, each upper input/output terminal 46 of a processor is coupled to the lower input/output terminal 48 of the next upper processor in the same column, each upper input/output terminal 946a is coupled to the lower input/output terminal 948b of the next upper processor (if any) in the column to its left, and each upper input/output terminal 946b is coupled to the lower input/output terminal 948a of the next upper processor (if any) in the column to its right.

When a fault has been isolated to a particular processor, as for example a processor 1410 in column 34k near the center of the array of FIG. 14, the erroneous partial sums generated thereby are decoupled from the next upper and the next lower processors in the same column. The upward-moving odd partial sum from the next lower processor 1412 is routed along a diagonal connection 1414 to processor 1416 in column 341. Processor 1416 does not add to the odd partial sum. Instead, processor 1416 effectively adds a zero value to the partial sum by simply holding the partial sum for one clock interval, and then at the next clock interval couples the unchanged odd partial sum over path 1420 to the next upper processor 1422 in column 34k. Thus, processor 1422 receives the unchanged partial sum which originated from processor 1412 in column 34k at the same time at which it would have expected the odd partial sum from failed processor 1410. Similarly, downward-moving even partial sums originating at processor 1422, may travel around failed processor 1410 by the path just described, or by another path including diagonal connection 1424, processor 1426, and diagonal connection 1428. Processor 1426 delays the partial sum for one clock interval. In this manner, upward-moving odd signals may bypass the failed processor by looping around to the right, while downward-moving signals bypass the failed processor by looping around to the left, or both odd and even signals may loop either to the left or to the right, as described below.

In the event of multiple failures in a column, as for example failure of processors 1410, 1412 and 1422 in column 34k, upward-moving odd samples from bottom processor 1440 may loop to the left around all three failed processors by a path including conductor 1442, processor 1444, conductor 1446, processor 1448, conductor 1450, processor 1452, and conductor 1454, thereby returning to processor 1456 in column 34k. While in the context of five processors in an array, the partial sum arriving at top processor 1456 in column 34k may be grossly in error, for a large array, the error attributable to bypassing three processors will be relatively small.

The signals may loop to the left or to the right around a region of failed processors, all under the control of the diagnostic control (not illustrated). If a failed column is at or near the left or right extremes of the array, the bypassing may be to the right and left of the failed region, respectively. It should also be noted that bypassing of any number of failed processors in a given column only requires two adjacent columns, since the bypassing information can "zig-zag" between the two adjacent columns during its progress past the failed region. Further, failures in two adjacent columns (except for simultaneous failures of three or more processors occurring in adjacent columns of the upper or lower combiners) can be bypassed by way of the next four adjacent columns by judicious selection of the bypassing points. The controllers necessary to provide bypassing control are believed to be well within the skill of those skilled in the art of process control, and the details thereof are not necessary for an understanding of the invention.

Figure 15:
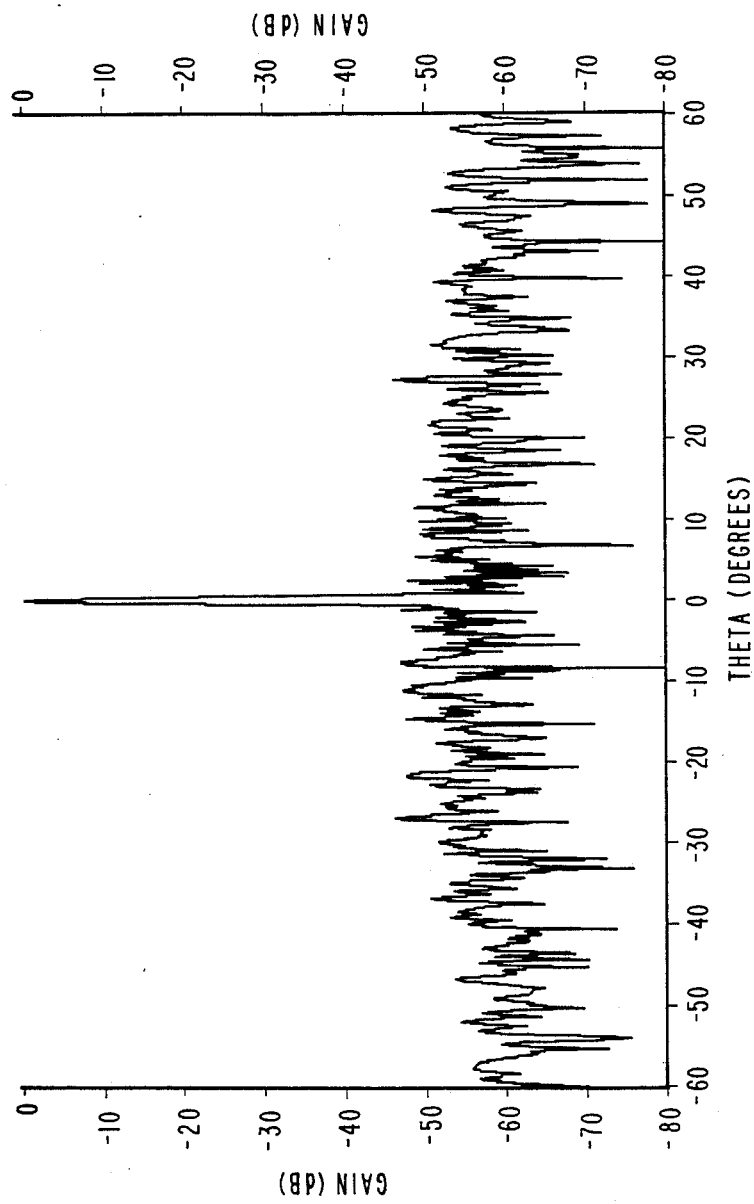
FIG. 15 is an antenna pattern of an array with by-passed failed elements.

FIG. 15 illustrates an antenna pattern of a 64×512 element array with 10% failed elements distributed randomly over the aperture, and with an additional 4×4 failed element cluster in the center, bypassed according to the above-described method. The pattern of FIG. 15 is almost identical to the pattern without the additional 4×4 failed element cluster (not illustrated). Note that the sidelobe level is about 50 dB down, compared with the sidelobe level of about −35 dB for a failure of the four center columns in FIG. 11. The improvement attributable to the bypassing is obvious.

Figure 16:
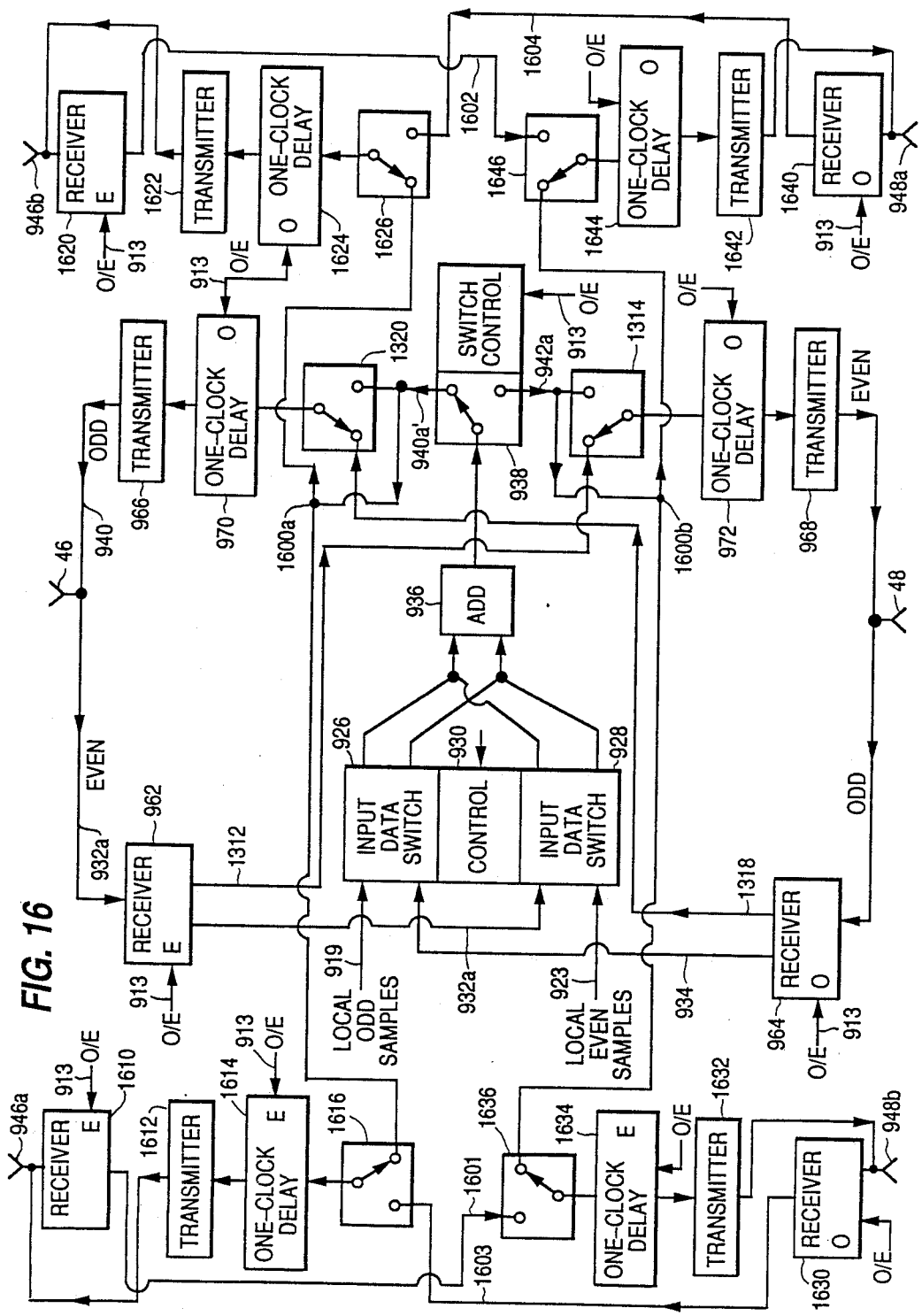
FIG. 16 is a simplified block diagram of a processor usable in the array of FIG. 14.

FIG. 16 is a simplified block diagram of a processor including multiple receivers and transmitters for implementating an array such as that described in conjunction with FIG. 14. Elements of FIG. 16 corresponding to those of FIGS. 13 and 14 are designated by the same reference numerals. In FIG. 16, each processor includes two additional upper input/output terminals 946a and 946b, and two additional lower input/output terminals 948a and 948b. In general, under normal operating conditions, the extra upper input/output terminals 946a and 946b transmit the same partial sum as does main input/output terminal 46, the extra lower input/output terminals 948a and 948b similarly transmit the same partial sum information as main lower input/output terminal 48. By appropriate control of the position of certain switches, additional receivers may be coupled for separately receiving signal over one or more additional inputs, which signals are separately delayed and retransmitted.

In FIG. 16, the elements added over those of FIG. 13 are designated by reference numerals in the 1600 series. The additional receivers are designated 1610, 1620, 1630 and 1640, the additional transmitters are designated 1612, 1622, 1632 and 1642, the additional one-clock delays are designated 1614, 1624, 1634 and 1644, and the additional mode selection switches are designated 1616, 1626, 1636, and 1646. An additional common conductor, which is connected to the output of adder 936 and to switches 1616, 1626, 1636 and 1646, is designated 1600.

In particular, upper left input/output terminal 946a of FIG. 16 is connected to the input of an even-signal receiver 1610, which is enabled by the even (E) portion of the odd/even (O/E) signal applied over conductor 913. The received signal is sent over a conductor 1601 to a mode selection switch 1636, which in its normal position (illustrated) blocks the signal. Upper left input/output terminal 946a is also connected to the output of a transmitter 1612, which receives signals from a one-clock delay 1614, which is clocked by the odd cycles of the O/E signal. Delay 1614 receives signal as selected by mode selection switch 1616. In the normal mode (illustrated), switch 1616 selects the partial sum signal from conductor 1600a for transmission by transmitter 1612. In its alternate position (not illustrated), mode selection switch 1616 couples to transmitter 1612 the signal received by way of receiver 1630 and a conductor 1603, from lower left input/output terminal 948b. Note that switches 1616 and 1626 are essentially in parallel with switch 1320, and switches 1636 and 1646 are essentially in parallel with switch 1314. Connections in this manner and the use of conductors 1600a and 1600b are necessary to separate the odd sums from the adder from the even sums from the same adder.

Similarly, at lower left of FIG. 16, mode selection switch 1636 in its normal operating position (illustrated) couples the partial sum signal from conductor 1600b to transmitter 1632 by way of delay 1634. Transmitter 1632 transmits downward-moving even samples to additional input/output terminal 948b. Upward-moving odd samples received at input/output terminal 948b are coupled over a conductor 1603 to mode selection switch 1616, which in the normal mode blocks the signal. When the above mentioned diagnostic system detects a failure in a processor other than the one illustrated in FIG. 16 which is to be circumvented by bypassing signals through the processor of FIG. 16, mode selection switches 1616 and 1636 are switched to their alternate positions (not illustrated). During odd clock cycles, receiver 1630 receives odd partial sums and couples them by conductor 1603 and switch 1616 to delay 1614. After being delayed for one clock cycle, the unmodified partial sum is retransmitted by transmitter 1612 from upper input/output terminal 946a. By reference to FIG. 14, it will be noted that in the array configuration, terminals 946a and 948b occupy mutually diagonal positions. During even clock cycles, downward-moving even partial sums received at upper input/output terminal 946a are coupled over conductor 1601 and switch 1636 to delay 1634. After delay for one even clock cycle, the unmodified partial sum is retransmitted by transmitter 1632 from lower input/output terminal 948b. In this manner, signals can move bidirectionally along the diagonal joining terminals 946a and 948b.

Signals can also be made to move bidirectionally along the diagonal (see FIG. 14) joining upper input/output terminal 946b and lower input/output terminal 948a. The structure connecting these terminals is not illustrated in FIG. 16 but would consist of switches connected identically to that connecting terminals 946a and 948a, and would operate in the same manner. Since these diagonal paths are also essentially independent, unmodified partial sum signals may flow along both diagonals independently without affecting the partial sums modified by local information flowing vertically between terminals 46 and 48.

Other embodiments of the invention will be apparent to those skilled in the art. For example, while the columns in FIGS. 2 and 3 have been described as "vertical", they can as easily be horizontal. Each processor may perform additional functions not expressly stated herein, such as decorrelation error cancellation. While a single RF connector 44 is illustrated in FIG. 2, the signals may be coupled by two such connectors if the signals from each dipole element of crossed dipole 42 are to be processed separately, and more such connectors may be provided for making other RF connections, as for example local oscillator signals for a downconverter. Similarly, other connectors may be provided as required for power, control, monitoring, phase increment selection and like functions.

In addition to bypassing elements of the array as described above, antenna beam improvement in the presence of failed modules may be possible by changing the weights applied to the data in the beamforming process.

What is claimed is:

1. A systolic array apparatus for combining information received substantially simultaneously at a plurality of input terminals which are regularly located along a line, comprising:
 a processor at each of said locations, each processor including an input port adapted to be coupled to said input terminal at said location, for receiving information from said input terminal during sequential intervals, each processor also including an information store for temporary storage of said information and also including at least first and second input/output terminals, for (a) under a first condition accepting information associated with a first one of said intervals from a first adjoining processor at said first input/output terminal for combining the information so received from said first adjoining processor with that portion of said stored information received at said input terminal during said first one of said intervals to produce a first combined signal at said second input/output terminal, and (b) under a second condition accepting information associated with a second one of said intervals from a second adjoining processor at said second input/output terminal, for combining the information so received from said second adjoining processor with that portion of said stored information received at said input terminal which is associated with said second one of said intervals to produce a second combined signal at said first input/output terminal 2. An apparatus according to claim 1 wherein the number of such processors is odd.

3. An apparatus according to claim 1 wherein a first processor of said processors is located at one end of said line, said second input/output terminal of said first processor being coupled to said first input/output terminal of the next adjacent one of said processors.

4. An apparatus according to claim 3 further comprising adding means coupled to said first input/output terminal of said first processor.

5. An apparatus according to claim 4 wherein: a last processor of said processors is located at the other end of said line, said first input/output terminal of said last processor being coupled to said second input/output terminal of the next adjacent ones of said processors, and further comprising;
 adding means coupled to said second input/output terminal of said last processor.

6. A systolic array apparatus for combining information received substantially simultaneously at a plurality of input terminals at locations distributed over a significant reception area, comprising:
 a processor at each of said locations, each processor including an input port adapted to be coupled to said input terminal at said location, for receiving information from said input terminal during sequential intervals, each processor also including an information store for temporary storage of said information and also including at least first and second input/output terminals, for (a) under a first condition accepting information associated with a first one of said intervals from a first adjoining processor at said first input/output terminal for combining the information so received from said first adjoining processor with that portion of said stored information received at said input terminal during said first one of said intervals to produce a first combined signal at said second input/output terminal, and (b) under a second condition accepting information associated with a second one of said intervals from a second adjoining processor at said second input/output terminal, for combining the information so received from said second adjoining processor with that portion of said stored information received at said input terminal which is associated with said second one of said intervals to produce a second combined signal at said first input/output terminal.

7. An apparatus according to claim 6, wherein said reception area is divided into at least first and second line arrays which are located in a mutually parallel manner, each line array comprising a plurality of said processors, including a first processor of a highest rank located at one end and a last processor of a lowest rank located at the other end, each of said processors of each line array including first and second auxiliary input/output terminals;
 said first processor of said first line array having its said second input/output terminal coupled to said first input/output terminal of the next adjacent one of said processors in said first line array, and said first input/output terminal of said last processor of said first line array being coupled to said second input/output terminal of the next adjacent one of said processors in said first line array;
 said first processor of said second line array having its said second input/output terminal coupled to said first input/output terminal of the next adjacent one of said processors in said second line array, and said first input/output terminal of said last processor of said second line array being coupled to said second input/output terminal of the next adjacent one of said processors in said second line array;
 each of said processors, but for said first and second processors of said first and second line arrays, having their said first input/output terminals coupled to said second input/output terminals of a processor of next higher rank in the same line array, and their second input/output terminals coupled to said first input/output terminals of a processor of next lower rank in the same line array;
 each of said processors of said first line array having its said second auxiliary input/output terminal coupled to said first auxiliary input/output terminal of the processor of the next rank is said second line array, for transferring partial sums produced by a selected processor of a particular rank of said first line array unmodified through a processor of a next adjacent rank of said second line array and for making the unmodified partial sum available on an auxiliary input/output terminal.

8. An apparatus according to claim 7, further comprising means for coupling said unmodified partial sum from said second auxiliary input/output terminal of said processor of said next adjacent rank of said second line array to a particular processor of said first line array, which particular processor is separated from said selected processor by at least one processor.

9. An apparatus according to claim 8, wherein each of said processors includes means for delaying said unmodified partial sum.

* * * * *